United States Patent
Itkowitz et al.

(10) Patent No.: US 7,990,374 B2
(45) Date of Patent: Aug. 2, 2011

(54) APPARATUS AND METHODS FOR HAPTIC RENDERING USING DATA IN A GRAPHICS PIPELINE

(75) Inventors: Brandon D. Itkowitz, Natick, MA (US); Loren C. Shih, Medford, MA (US); Marc Douglass Midura, Somerville, MA (US); Joshua E. Handley, Silver Spring, MD (US); William Alexander Goodwin, Cambridge, MA (US)

(73) Assignee: SensABLE Technologies, Inc., Woburn, MA (US)

(*) Notice: Subject to any disclaimer, the term of this patent is extended or adjusted under 35 U.S.C. 154(b) by 1009 days.

(21) Appl. No.: 11/169,175

(22) Filed: Jun. 28, 2005

(65) Prior Publication Data
US 2006/0109266 A1 May 25, 2006

Related U.S. Application Data

(60) Provisional application No. 60/584,001, filed on Jun. 29, 2004.

(51) Int. Cl.
*G06T 15/00* (2011.01)
(52) U.S. Cl. ........ 345/419; 345/420; 345/619; 345/629; 84/609; 703/4; 715/757
(58) Field of Classification Search .......... 345/419, 345/420, 422, 619, 620; 84/609; 703/4; 715/757
See application file for complete search history.

(56) References Cited

U.S. PATENT DOCUMENTS

| 3,846,826 A | 11/1974 | Mueller |
| 4,868,761 A | 9/1989 | Hayashi |
| 4,868,766 A | 9/1989 | Oosterholt |
| 4,901,253 A | 2/1990 | Iwano et al. |
| 5,027,292 A | 6/1991 | Rossignac et al. |
| 5,265,197 A | 11/1993 | Kondo |
| 5,273,038 A | 12/1993 | Beavin |
| 5,304,884 A | 4/1994 | Kitajima et al. |
| 5,321,622 A | 6/1994 | Snead et al. |
| 5,388,199 A | 2/1995 | Kakazu et al. |
| 5,428,715 A | 6/1995 | Suzuki |
| 5,455,902 A | 10/1995 | Ellson et al. |

(Continued)

FOREIGN PATENT DOCUMENTS

EP 0364947 B1 4/1990

(Continued)

OTHER PUBLICATIONS

Lin et al., "Contact Determination for Real-Time Haptic Interaction in 3D Modeling, Editing, and Painting," in Salisbury, J. K. and Srinivasan, M. A. (Eds.), Proc.Fourth PHANTOM Users Group Workshop, AI Lab Technical Report No. 1675 and RLE Technical Report No. 633, MIT (1999).*

(Continued)

*Primary Examiner* — Phu Nguyen
(74) *Attorney, Agent, or Firm* — Goodwin Procter LLP

(57) ABSTRACT

The invention provides methods for leveraging data in the graphics pipeline of a 3D graphics application for use in a haptic rendering of a virtual environment. The invention provides methods for repurposing graphical information for haptic rendering. Thus, at least part of the work that would have been performed by a haptic rendering process to provide touch feedback to a user is obviated by work performed by the graphical rendering process.

69 Claims, 15 Drawing Sheets

U.S. PATENT DOCUMENTS

| | | | |
|---|---|---|---|
| 5,479,593 | A | 12/1995 | Brewer et al. |
| 5,481,470 | A | 1/1996 | Snead et al. |
| 5,487,012 | A | 1/1996 | Topholm et al. |
| 5,497,452 | A | 3/1996 | Shimizu et al. |
| 5,515,078 | A | 5/1996 | Greschler et al. |
| 5,561,747 | A | 10/1996 | Crocker et al. |
| 5,561,748 | A | 10/1996 | Niu et al. |
| 5,576,727 | A | 11/1996 | Rosenberg et al. |
| 5,623,582 | A | 4/1997 | Rosenberg |
| 5,625,576 | A | 4/1997 | Massie et al. |
| 5,629,594 | A | 5/1997 | Jacobus et al. |
| 5,633,951 | A | 5/1997 | Moshfeghi |
| 5,649,076 | A | 7/1997 | Nishizaka et al. |
| 5,691,898 | A | 11/1997 | Rosenberg et al. |
| 5,701,140 | A | 12/1997 | Rosenberg et al. |
| 5,704,791 | A | 1/1998 | Gillio |
| 5,721,566 | A | 2/1998 | Rosenberg et al. |
| 5,751,289 | A | 5/1998 | Myers |
| 5,766,016 | A | 6/1998 | Sinclair et al. |
| 5,769,640 | A | 6/1998 | Jacobus et al. |
| 5,808,616 | A | 9/1998 | Shimizu |
| 5,815,154 | A | 9/1998 | Hirschtick et al. |
| 5,844,392 | A | 12/1998 | Peurach et al. |
| 5,999,187 | A * | 12/1999 | Dehmlow et al. ............. 345/420 |
| 6,046,726 | A | 4/2000 | Keyson |
| 6,111,577 | A | 8/2000 | Zilles et al. |
| 6,115,046 | A | 9/2000 | Chen et al. |
| 6,120,171 | A | 9/2000 | Shaikh |
| 6,131,097 | A | 10/2000 | Peurach et al. |
| 6,191,796 | B1 | 2/2001 | Tarr |
| 6,308,144 | B1 | 10/2001 | Bronfeld et al. |
| 6,448,977 | B1 | 9/2002 | Braun et al. |
| 6,570,564 | B1 * | 5/2003 | Sowizral et al. ............. 345/420 |
| 6,628,280 | B2 * | 9/2003 | Perry et al. .................... 345/420 |
| 6,703,550 | B2 * | 3/2004 | Chu ................................ 84/609 |
| 6,704,694 | B1 * | 3/2004 | Basdogan et al. ................. 703/4 |
| 6,773,408 | B1 | 8/2004 | Acker et al. |
| 6,792,398 | B1 | 9/2004 | Handley et al. |
| 6,803,928 | B2 * | 10/2004 | Bimber et al. ................ 715/757 |
| 6,809,738 | B2 * | 10/2004 | Hubrecht et al. ............. 345/543 |
| 6,822,635 | B2 * | 11/2004 | Shahoian et al. ............. 345/156 |
| 7,050,955 | B1 | 5/2006 | Carmel et al. |
| 7,208,671 | B2 * | 4/2007 | Chu ................................ 84/609 |
| 7,432,910 | B2 * | 10/2008 | Shahoian ...................... 345/163 |
| 2002/0130820 | A1 | 9/2002 | Sullivan |
| 2006/0202953 | A1 | 9/2006 | Pryor et al. |

FOREIGN PATENT DOCUMENTS

| | | |
|---|---|---|
| EP | 0518648 B1 | 12/1992 |
| JP | 62-148434 A | 7/1987 |
| JP | 63-149416 A | 6/1988 |
| JP | 63-177497 A | 7/1988 |
| JP | 3-137722 A | 6/1991 |
| JP | 63-09244 A | 11/1994 |

OTHER PUBLICATIONS

"Mastering Windows 3.1 Special Edition", by Robert Cowart, Chapter 11, 1993 SYBEX Inc.

Official Action from Japanese Patent Office, Application No. 7-510838 dated Dec. 22, 2009.

Open Inventor 2.1 Performance Tips, released Apr. 1996, p. 4, 6 and 8.

Open Inventor 4.0 Release Notes, released Apr. 2003, p. 5.

Seeger et al. "Controlling Force Feedback Over a Network" published as part of the Proceedings of the Second Phantom Users Group Workshop, Dec. 1997.

International Search Report and Written Opinion for PCT/US2005/023218, dated Apr. 6, 2006.

"Efficient Point-Based Rendering Techniques for Haptic Display of Virtual Objects," Ho et al., Proceedings of the Genetic and Evolutionary Computation Conference, vol. 8, No. 5, Oct. 1999 pp. 477-491.

"Exploration and Virtual Control in Virtual Three Dimensional Environments," Ware et al., Proceedings of the 1990 Symposium on Interactive 3D Graphics, Mar. 25, 1990, Snowbird, Utah, pp. 175-183.

"Fast 3D Geometric Proximity Queries between Rigid and Deformable Models Using Graphics Hardware Acceleration," Hoff III, et al., The University of North Carolina at Chapel Hill, Dept. of Computer Science, Technical Report TR02-004, 2002.

"Haptic Rendering in Virtual Environments," Basdogan et al., Virtual Environment Handbook, 2001.

"Realistic Cross-Platform Haptic Applications Using Freely-Available Libraries," Luciano et al., Proceedings of the 12th Symposium on Haptic Interfaces for Virtual Environment and Teleoperator Systems, Mar. 28, 2004, Chicago.

"User-Centric Viewpoint Computation for Haptic Exploration and Manipulation," Otaduy et al., Proceedings on the Conference of Visualization '01, Oct. 21, 2001, San Diego, pp. 311-318.

"Using Modern Graphics Architectures for General-Purpose Computing: A Framework and Analysis," Thompson et al., Proceedings of the 35th Annual IEEE/ACM International Symposium on Microarchitecture, vol. 35, 2002.

\* cited by examiner

APPARATUS AND METHODS FOR HAPTIC RENDERING USING DATA IN A GRAPHICS PIPELINE

RELATED APPLICATIONS

The present application is related to commonly-owned U.S. patent application entitled, "Apparatus and Methods for Haptic Rendering Using a Haptic Camera View," by Itkowitz, Shih, Midura, Handley, and Goodwin, filed under Ser. No. 11/169,271 on even date herewith, the text of which is hereby incorporated by reference in its entirety; the present application is also related to commonly-owned international (PCT) patent application entitled, "Apparatus and Methods for Haptic Rendering Using Data in a Graphics Pipeline," by Itkowitz, Shih, Midura, Handley, and Goodwin, filed under PCT/US05/23218 on even date herewith, the text of which is hereby incorporated by reference in its entirety; the present application claims the benefit of U.S. Provisional Patent Application No. 60/584,001, filed on Jun. 29, 2004, the entirety of which is incorporated by reference herein.

FIELD OF THE INVENTION

The invention relates generally to haptic rendering of virtual environments. More particularly, in certain embodiments, the invention relates to the haptic rendering of a virtual environment using data from the graphics pipeline of a 3D graphics application.

BACKGROUND OF THE INVENTION

Haptic technology involves simulating virtual environments to allow user interaction through the user's sense of touch. Haptic interface devices and associated computer hardware and software are used in a variety of systems to provide kinesthetic and/or tactile sensory feedback to a user in addition to conventional visual feedback, thereby affording an enhanced man/machine interface. Haptic systems are used, for example, in manufactured component design, surgical technique training, industrial modeling, robotics, and personal entertainment. An example haptic interface device is a six degree of freedom force reflecting device as described in co-owned U.S. Pat. No. 6,417,638, to Rodomista et al., the description of which is incorporated by reference herein in its entirety.

A haptic rendering process provides a computer-based kinesthetic and/or tactile description of one or more virtual objects in a virtual environment. A user interacts with the virtual environment via a haptic interface device. Analogously, a graphical rendering process provides a graphical description of one or more virtual objects in a virtual environment. Typically, a user interacts with graphical objects via a mouse, joystick, or other controller. Current haptic systems process haptic rendering data separately from graphical rendering data.

The graphical rendering of 3D virtual environments has been enhanced by the advent of 3D graphics application programming interfaces (APIs), as well as 3D graphics (video) cards. A programmer may create or adapt a 3D graphics application for rendering a 3D graphics virtual environment using the specialized libraries and function calls of a 3D graphics API. Thus, the programmer avoids having to write graphics rendering code that is provided in the API library. As a result, the task of programming a 3D graphics application is simplified. Furthermore, graphics standards have developed such that many currently-available 3D graphics applications are compatible with currently-available 3D graphics API's, allowing a user to adapt the 3D graphics application to suit his/her purpose. Examples of such 3D graphics API's include OpenGL, DirectX, and Java 3D.

In addition to 3D graphics API's, 3D graphics cards have also improved the graphical rendering of 3D virtual objects. A 3D graphics card is a specialized type of computer hardware that speeds the graphical rendering process. A 3D graphics card performs a large amount of the computation work necessary to translate 3D information into 2D images for viewing on a screen, thereby saving CPU resources.

While 3D graphics API's and graphics cards have significantly improved the graphical rendering of 3D objects, the haptic rendering of 3D objects in a virtual environment is a comparatively inefficient process. Haptic rendering is largely a separate process from graphical rendering, and currently-available 3D graphics applications are incompatible with haptic systems, since graphics applications are not designed to interpret or provide haptic information about a virtual environment.

Furthermore, haptic rendering processes are generally computation-intensive, requiring high processing speed and a low latency control loop for accurate force feedback rendering. For example, in order to realistically simulate touch-based interaction with a virtual object, a haptic rendering process must typically update force feedback calculations at a rate of about 1000 times per second. This is significantly greater than the update rate needed for realistic dynamic graphics display, which is from about 30 to about 60 times per second in certain systems. For this reason, current haptic systems are usually limited to generating force feedback based on single point interaction with a virtual environment. This is particularly true for haptic systems that are designed to work with widely-available desktop computers and workstations with state-of-the-art processors.

Thus, there is a need for increased efficiency in haptic rendering. Improvement is needed, for example, to facilitate the integration of haptics with currently-available 3D applications, to permit greater haptic processing speeds, and to enable the use of more sophisticated force feedback techniques, thereby increasing the realism of a user's interaction with a virtual environment.

SUMMARY OF THE INVENTION

The invention provides methods for leveraging data in the graphics pipeline of a 3D graphics application for use in a haptic rendering of a virtual environment. The invention provides methods for repurposing graphical information for haptic rendering. Thus, at least part of the work that would have been performed by a haptic rendering process to provide touch feedback to a user is obviated by work performed by the graphical rendering process.

The invention allows integration of haptic functionality in currently-available 3D graphics applications. For example, in one embodiment, the invention includes an API that performs function calls to access data in a graphics pipeline of a 3D graphics application, where the data relates to one or more virtual objects in a virtual environment. The data is then interpreted for use in a haptic rendering of the virtual environment. The user is able to interact with the virtual environment via a haptic interface device through which the user receives force feedback, all while viewing the graphical rendering provided by the 3D graphics application.

Since graphical data is repurposed for haptic rendering, the efficiency of the haptic rendering process is increased, permitting greater haptic processing speeds for more realistic kinesthetic simulation. For example, in one embodiment, the force feedback computation speed is increased from a rate of about 1000 Hz to a rate of about 10,000 Hz or more. Furthermore, the invention allows more sophisticated haptic interaction techniques to be used with widely-available desktop computers and workstations. For example, forces can be computed based on the interaction of one or more points, lines, planes, and/or spheres with virtual objects in the virtual environment, not just based on single point interaction. More sophisticated haptic interface devices that require multi-point interaction can be used, including pinch devices, multi-finger devices, and gloves, thereby enhancing the user's haptic experience. Supported devices include kinesthetic and/or tactile feedback devices. For example, in one embodiment, a user receives tactile feedback when in contact with the surface of a virtual object such that the user can sense the texture of the surface.

Similarly, the invention allows the use of more sophisticated constraints and force effects, which can be incorporated in a virtual environment and associated with various positions within the virtual environment and/or associated with various actions that a user takes in the virtual environment. These include "snap-to" constraints, detents, and force effects including inertial effects, viscosity effects, simulation of 3D friction, material property simulation, stiffness, damping, and force shading. Animation of virtual objects in a virtual environment is also enhanced by the increased efficiency of haptic rendering processes provided by methods of the invention.

In one aspect, the invention provides a method of interpreting data for use in haptically rendering a virtual environment containing one or more virtual objects. The method includes the steps of accessing data in a graphics pipeline of a 3D graphics application and interpreting the data for use in haptic rendering. The data preferably includes graphical rendering data that is descriptive of one or more geometric elements of a virtual object in the virtual environment, including, for example, data in a depth buffer, a feedback buffer, a color buffer, a selection buffer, a stencil buffer, an accumulation buffer, a texture map, a fat framebuffer, and/or rasterization primitives. The data may also include API input data, state data, and/or transformation matrices for mapping between object space and screen space, for example. API state data includes, for example, an operator, an operand, a resultant state, a stencil buffer, a raster position, a lighting variable, a line width, an enabling status, and a disabling status.

3D graphics API's typically use data buffers to store graphical information. For example, 3D scene geometry can be represented by primitives which are then converted to 2D image data via a rasterization process and are thereafter stored in a depth buffer. Certain 3D graphics API's, for example, OpenGL, also use a feedback buffer, which stores 3D primitives that are about to be rasterized. Data buffers are generally accessible by the 3D graphics application via function calls to the API. Data buffers may also be accessed and modified by a graphics card. Thus, a significant amount of the 3D graphics rendering work can be performed by a graphics card, thereby freeing processing capacity of the CPU.

In one embodiment, the method includes accessing depth buffer values, for example, by making a function call to a 3D graphics API. Generally speaking, a depth buffer is an image made up of pixels whose intensity values correspond to depth (or height) values in relation to a camera position or plane. The depth buffer is often used during polygon rasterization to quickly determine if a geometric fragment is occluded by a previously-rendered polygon.

In the invention, depth buffer values can be used for haptic rendering. For example, one method of the invention includes the step of accessing data from a depth buffer and interpreting the data for haptic rendering, for example, by using the data to locate a point on the surface of a virtual object in the virtual environment. In one embodiment, a surface point is located by determining an intersection point and an intersection normal in screen space using data from the depth buffer and transforming coordinates of the intersection point and intersection normal from screen space to object space. The intersection point and intersection normal define a local plane tangent to the surface of the virtual object, and can be used to haptically render the virtual object.

Graphical data can be interpreted for haptic rendering, for example, by performing a line segment intersection test. Line segments are transformed from object space to screen space and resultant intersection points and normals are transformed from screen space to object space. The intersection points are preferably points on or near the surface of a virtual object in the virtual environment. The interpreting step may further include combining a plurality of transforms—such as a world-to-view transformation, a projection transformation (i.e. a view-to-clip transformation, as described herein), and a screen transformation (i.e. a clip-to-window transformation, as described herein)—into a single transform. The concatenated transformation (and/or its inverse) can then be used to transform points from object space to screen space and/or from screen space to object space. The interpreting step may include correcting perspective foreshortening. This may include, for example, compensating for depth value nonlinearity under perspective projection and/or adjusting the local z-scale of captured geometry so that all dimensions are of the same proportional scale. For example, data from the feedback or depth buffer may be expressed in window coordinates <X,Y,Z>, where X and Y indicate pixel location and Z indicates depth in the range [0,1]. Because precision is important for haptic rendering, the Z dimension can be mapped so that it has the same relative scale as X and Y. This allows the use of a single epsilon value for geometry processing that is consistent for all three dimensions.

It is possible to interpret the contents of certain graphical data buffers as modifiers for the depth values of the depth buffer. These include, for example, the color buffer, stencil buffer, and accumulation buffer. In one embodiment, the color buffer is used to encode surface normals for force shading. In another embodiment, the stencil buffer is used to attribute material properties—such as friction, viscosity, inertia, stiffness, and damping, for example—to pixels and, by extension, to points in the virtual environment for purposes of force shading. Force shading includes, for example, simulating force effects such as viscosity, inertia, friction, attraction, repulsion, and vibration effects via a haptic interface device. Force shading may also include general conditioning and/or filtering of a computed force vector, for example, in order to reduce directional and/or temporal discontinuities resulting from control system instabilities or mechanical instabilities of the haptic interface device.

Graphics cards have the ability to execute custom fragment and vertex shading programs, thereby enabling a programmable graphics pipeline. Thus, in one embodiment, the invention leverages the results of additional geometry modification that occurs in the graphics pipeline. Examples of hardware accelerated geometry modification includes, for example, view-dependent adaptive subdivision, view-dependent tessellation, displacement mapping, and normal mapping. View-dependent adaptive subdivision and view-dependent tessellation may result in smoother-feeling surfaces, while displacement mapping may provide additional geometry detail, such as ripples, crevices, and bumps, that would be expensive to specify as geometry from CPU, but is less expensive to generate onboard a graphics card. By using the depth buffer haptic rendering technique of the invention, even this detail generated solely on the graphics card can be made to be touchable.

In one embodiment, the invention includes accessing a fat framebuffer in a graphics pipeline. As the term is used herein, a fat framebuffer is also known as and/or includes a floating point auxiliary buffer, an attribute buffer, a geometry buffer, and/or a super buffer. Fat framebuffers are flexible and allow a user to store a wide variety of different types of graphical data. A fat framebuffer can include, for example, vertex positions, normals, color, texture, normal maps, bump maps, and/or depth data. Fat framebuffers can be used as input in custom pixel and/or vertex shader programs that are run on graphics hardware (i.e. on the graphics card). In one embodiment, a fat framebuffer is used to capture vertex positions and normals. For example, in one embodiment, primitives are graphically rendered to a fat framebuffer, and pixel shading and/or vertex shading is performed using data from the fat framebuffer in the haptic rendering of a virtual environment. In one embodiment, a deferred shading process is used to render graphics primitives to a fat framebuffer.

It is possible to use graphics hardware to graphically render virtual objects to a texture map instead of a buffer. Thus, one embodiment of the invention includes accessing data from a texture map in a graphics pipeline, and interpreting the data for use in a haptic rendering of a virtual environment.

One type of graphical data that can be used for haptic rendering includes rasterization primitives. Thus, a method of the invention includes the steps of accessing a data buffer containing rasterization primitives (for example, a feedback buffer in OpenGL), and interpreting the data for haptic rendering. Rasterization primitives include information used by the rasterizer for scan-filling primitives to a viewport. In OpenGL, a feedback buffer contains rasterization primitives. Contents of the feedback buffer or its equivalent can be used to haptically interpret a non-uniform surface, for example.

The feedback buffer provides access to geometric elements within a selected view volume, while excluding elements outside the view volume. The view volume may be sized to limit the information received, thereby improving data processing efficiency. For example, the view volume may be sized so that the feedback buffer contains geometric information within a desired distance of a user-determined location (i.e. within a cropped view from a user-controlled virtual camera, where the view corresponds to a user-indicated "eye position" and view direction). This involves culling the graphical data to remove geometric primitives that lie outside the view volume. In one embodiment, hardware culling is employed, where primitives are culled by graphics hardware (i.e. a graphics card). In another embodiment, culling involves the use of a spatial partition, for example, an octree, BSP tree, or other hierarchical data structure, to exclude graphical data outside the view volume. Both hardware culling and a spatial partition can be used together. For example, where the number of primitives being culled by the graphics hardware is large, the spatial partition can reduce the amount of data sent to the hardware for culling, allowing for a more efficient process. Additional advantages are realized where the eye position of the virtual camera is a haptic interface location that changes as the user manipulates a haptic interface device to move within the haptic environment.

For example, in one embodiment, a virtual camera is located substantially at a haptic interface location in order to obtain graphical data in the vicinity of the haptic interface location as it moves throughout the virtual environment. The user controls the movement of the haptic interface location by manipulating a haptic interface device in real space. Graphical data obtained from a virtual camera located at or near the haptic interface location can be interpreted haptically. The graphical data may include, for example, rasterization data from a feedback buffer (described above as limited to a particular view volume), as well as data from a depth buffer and/or other data buffer.

Thus, a user is allowed to manipulate a "haptic camera" within the virtual environment. The haptic camera obtains graphical data pertaining to virtual objects within the vicinity and along the trajectory of the haptic device. The graphical data from the camera is interpreted haptically, thereby providing touch feedback to the user. The efficiency of haptic rendering is improved, because the view volume can be limited to a region that the user will be able to touch at a given time, and further because the method takes advantage of the processing capacity of the graphics pipeline. In one embodiment, the viewing volume is sized based at least in part on the motion of the haptic interface. For example, higher velocity motion may require obtaining more geometry within the vicinity of the haptic interface location, since the device will be sweeping out more space over the course of the graphics frame interval than it would at lower velocities. Conversely, the view volume can shrink as user motion slows or settles on a location, such that only highly local geometry is captured. The method also allows haptic rendering of portions of a virtual environment that cannot be "seen" in a 2D display of the virtual object, for example, the back side of an object, the inside of crevices and tunnels, and portions of objects that lie behind other objects.

In one embodiment, graphical data obtained from both a first and a second camera positioned within the virtual environment is interpreted for haptic rendering. In one embodiment, the first camera is at a fixed location, and the second camera moves according to the movement of a user-controlled haptic interface location.

After accessing data in the graphics pipeline and interpreting the data for use in a haptic rendering of the virtual environment, one embodiment of the invention further includes the step of haptically rendering the virtual environment using the interpreted data. The step of haptically rendering the virtual environment may include providing a representation of the surface(s) of one or more virtual objects in the virtual environment.

In one embodiment, haptic rendering includes the steps of determining a haptic interface location in the virtual environment corresponding to a location of a haptic interface device in real space, determining a location of one or more points on the surface of a virtual object in the virtual environment, and determining an interaction force based at least partly on the haptic interface location and the location of the surface of the virtual object. For example, haptic rendering can include determining a force according to the location of a user-controlled haptic interface in relation to the surface of a virtual object in the virtual environment. If the virtual surface collides with the haptic interface location, a corresponding force is calculated and can be fed to the user through the haptic interface device. Preferably, this occurs in real-time during the operation of the 3D graphics application.

In order to allow a user to interact in the virtual environment both graphically and haptically, one embodiment of the invention includes generating user-interface input. Many 3D graphics applications operate using a mouse or other 2D controller. However, the haptic interface device is typically operable in more than two dimensions. For example, the haptic interface device may be the PHANTOM® device from SensAble Technologies, Inc., of Woburn, Mass., which can sense six degrees of freedom—x, y, z, pitch, roll, and yaw—while providing force feedback in three degrees of freedom—x, y, and z. Therefore, one embodiment of the invention includes generating user interface input by converting a 3D position of a haptic interface device into a 2D cursor position, for example, via mouse cursor emulation. To further facilitate use of a haptic interface device with a 3D graphics application, one embodiment of the invention includes the step of haptically rendering a user interface menu. Thus, menu items available in the 3D graphics application, which are normally accessed using a 2D mouse, can be accessed using a haptic interface device that is operable in three dimensions. In a further embodiment, a boreline selection feature is used, for example, an embodiment of the invention described in co-owned U.S. Pat. No. 6,671,651, by Goodwin et al., which is incorporated by reference herein in its entirety. This allows a user to "snap to" a three dimensional position, such as a position corresponding to a menu item of a 3D graphics application, without having to search in the "depth" direction for the desired position. An object can be selected based on whether it aligns (as viewed on a 2D screen) with a haptic interface location.

In another aspect, the invention is directed to an apparatus for providing haptic feedback to the user of a 3D graphics application. The apparatus includes a user-controlled haptic interface device adapted to provide user input to a computer and to transmit force to the user, and computer software that is adapted to determine force transmitted to the user. The software, when operating with the computer and the user input, is adapted to access data from a graphics pipeline of a 3D graphics application and haptically render a virtual object in the virtual environment using the accessed data. The force is determined according to the position of the haptic interface location in relation to a surface of the virtual object. For example, the apparatus provides force feedback to the user of a 3D graphics application as the user-guided motion of a haptic interface leads to penetration of a surface of a virtual object in a virtual environment.

In one embodiment, the haptic interface device has at least two degrees of freedom. The haptic interface device may have three, four, five, six, seven, or more degrees of freedom. The haptic interface device may have at least one button input, and may include one or more of a button, a joystick, a stylus, a wheel, a mouse, a gripper, a pressure pad, a toggle switch, a pinching mechanism, and a pressure switch.

Additionally, the 3D graphics application may comprise one or more graphics tools. Examples of graphics tools include a drawing tool, an editing tool, a control point editing tool, a sculpting tool, a pressure-sensitive sculpting tool, a painting tool, a pressure-sensitive painting tool, an airbrush, and an angle-sensitive airbrush. In one embodiment, the force transmitted to the user is a function of an action of a graphics tool of the 3D graphics application. Furthermore, the haptic device, in one embodiment, is adapted to receive force from the user. For example, the user input may comprise user-imposed force, and the software is adapted to generate input for use by the 3D graphics application based at least in part on the user-imposed force. In one embodiment, the virtual environment comprises one or more animated objects.

In an alternative embodiment, the invention is directed to a method for interpreting data for use in a haptic rendering of a virtual environment, the method including the step of intercepting a portion of the data in a graphics pipeline of a 3D graphics application using a pass-through dynamic link library or shared library. The method may further include reading data that is written to the memory buffer and determining a height map based on the data. The height map describes at least a portion of the surface of a virtual object in the virtual environment. In one embodiment, a mesh is generated based on the height map. The method can be employed without modifying the source code or binary of the target 3D graphics application.

BRIEF DESCRIPTION OF DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 8B is/are used to haptically render the virtual object, according to an illustrative embodiment of the invention.

DETAILED DESCRIPTION OF THE INVENTION

Throughout the description, where an apparatus is described as having, including, or comprising specific components, or where systems, processes, and methods are described as having, including, or comprising specific steps, it is contemplated that, additionally, there are apparati of the present invention that consist essentially of, or consist of, the recited components, and that there are systems, processes, and methods of the present invention that consist essentially of, or consist of, the recited steps.

It should be understood that the order of steps or order for performing certain actions is immaterial so long as the invention remains operable. Moreover, two or more steps or actions may be conducted simultaneously.

A computer hardware apparatus may be used in carrying out any of the methods described herein. The apparatus may include, for example, a general purpose computer, an embedded computer, a laptop or desktop computer, or any other type of computer that is capable of running software, issuing suitable control commands, receiving graphical user input, and recording information. The computer typically includes one or more central processing units for executing the instructions contained in software code that embraces one or more of the methods described herein. The software may include one or more modules recorded on machine-readable media, where the term machine-readable media encompasses software, hardwired logic, firmware, object code, and the like. Additionally, communication buses and I/O ports may be provided to link any or all of the hardware components together and permit communication with other computers and computer networks, including the internet, as desired. As used herein, the term "3D" is interpreted to include 4D, 5D, and higher dimensions.

It is an object of the invention to leverage the processing power of modern 3D graphical rendering systems for use in the haptic rendering of a virtual environment containing, for example, one or more virtual objects. It is a further object of the invention to introduce a virtual camera in the virtual environment located at a haptic interface location, which can be moved by a user. The view volume of this "haptic camera" can be sized to exclude unnecessary regions of the virtual environment, and the graphical data can be used for haptically rendering one or more virtual objects as the user moves about the virtual environment.

Figure 1:
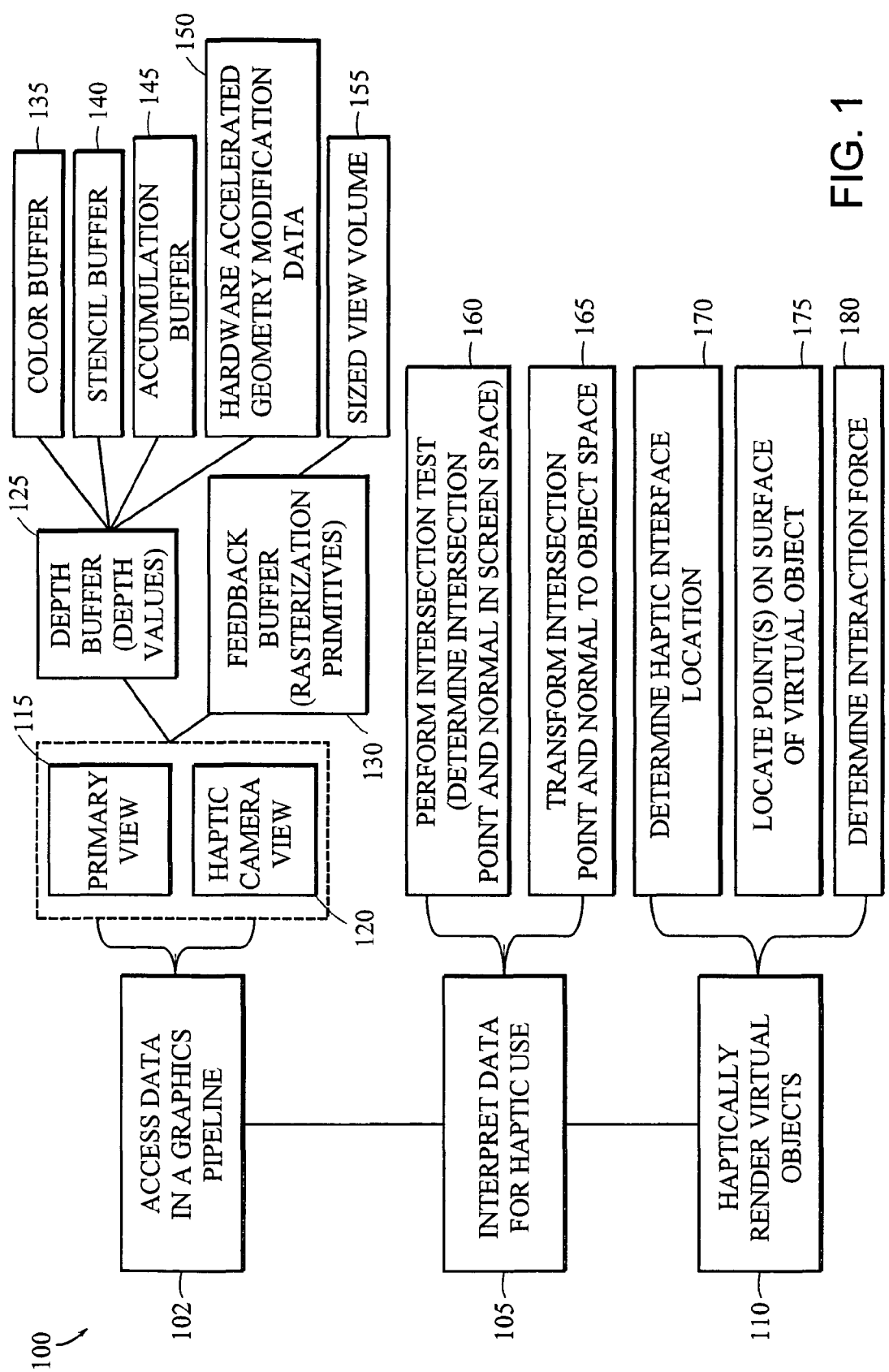
FIG. 1 is a block diagram featuring a method of haptically rendering one or more virtual objects in a virtual environment using data in a graphics pipeline, according to an illustrative embodiment of the invention.

FIG. 1 is a block diagram 100 featuring a method of haptically rendering one or more virtual objects in a virtual environment using data in a graphics pipeline of a 3D graphics application. The method shown in FIG. 1 includes three main steps—accessing data in a graphics pipeline of a 3D graphics application 102; interpreting data for use in haptic rendering 105; and haptically rendering one or more virtual objects in the virtual environment 110.

A graphics pipeline generally is a series of steps, or modules, that involve the processing of 3D computer graphics information for viewing on a 2D screen, while at the same time rendering an illusion of three dimensions for a user viewing the 2D screen. For example, a graphics pipeline may comprise a modeling transformation module, in which a virtual object is transformed from its own object space into a common coordinate space containing other objects, light sources, and/or one or more cameras. A graphics pipeline may also include a rejection module in which objects or primitives that cannot be seen are eliminated. Furthermore, a graphics pipeline may include an illumination module that colors objects based on the light sources in the virtual environment and the material properties of the objects. Other modules of the graphics pipeline may perform steps that include, for example, transformation of coordinates from world space to view space, clipping of the scene within a three dimensional volume (a viewing frustum), projection of primitives into two dimensions, scan-conversion of primitives into pixels (rasterization), and 2D image display.

Information about the virtual environment is produced in the graphics pipeline of a 3D graphics application to create a 2D display of the virtual environment as viewed from a given camera view. The camera view can be changed to view the same virtual environment from a myriad of vantage points. The invention capitalizes on this capability by haptically rendering the virtual environment using graphical data obtained from one or more virtual cameras. In one embodiment, the invention accesses data corresponding to either or both of a primary view 115 and a haptic camera view 120, where the primary view 115 is a view of the virtual environment from a fixed location, and the haptic camera view 120 is a view of the virtual environment from a moving location corresponding to a user-controlled haptic interface location. The haptic camera view 120 allows a user to reach behind an object to feel what is not immediately visible on the screen (the primary view 115).

Information about the geometry of the virtual environment can be accessed by making the appropriate function call to the graphics API. Data can be accessed from one or more data buffers—for example, a depth buffer 125, as shown in the block diagram of FIG. 1, and a feedback buffer 130 (or its equivalent). Use of this data for haptic rendering enables the reuse of the scene traversal and graphics API rendering state and functionality.

The depth buffer 125 is typically a two-dimensional image containing pixels whose intensities correspond to depth (or height) values associated with those pixels. The depth buffer is used during polygon rasterization to quickly determine if a fragment is occluded by a previously rendered polygon. The depth buffer is accessed by making the appropriate function call to the graphics API. This information is then interpreted in step 105 of the method of FIG. 1 for haptic use. Using depth buffer data provides several advantages. For example, depth buffer data is in a form whereby it can be used to quickly compute 3D line segment intersections and inside/outside tests. Furthermore, the speed at which these depth buffer computations can be performed is substantially invariant to the density of the polygons in the virtual environment. This is because the data in the depth buffer is scalar data organized in a 2D grid having known dimensions, the result of rasterization and occlusion processing.

Other data buffers in the graphics pipeline include a color buffer 135, a stencil buffer 140, and an accumulation buffer 145. The color buffer 135 can store data describing the color and lighting conditions of vertices. The accumulation buffer 145 can be used to accumulate precise intermediate rendering data. The stencil buffer 140 can be used to flag attributes for each pixel and perform logic operations as part of pixel fragment rendering. These buffers may be used, for example, to modify and/or map various haptic attributes—for example, friction, stiffness, and/or damping—to the pixel locations of the depth buffer. For example, color buffer data 135 may be used to encode surface normals for force shading. Stencil buffer data 140 can indicate whether or not to allow drawing for given pixels. Stencil buffer data 140 can also be incremented or decreased every time a pixel is touched, thereby counting the number of overlapping primitives for a pixel. The stencil contents can be used directly or indirectly for haptic rendering. For example, it can be used directly to flag pixels with attributes for enabling and/or disabling surface materials, such as areas of friction. It can also be used indirectly for haptics by graphically rendering geometry in a special way for haptic exploration, like depth peeling or geometry capping.

Encoding normals in the color buffer includes setting up the lighting of the virtual environment so that normals may be mapped into values in the color buffer, wherein each pixel contains four components <r,g,b,a>. A normal vector <x,y,z> can be stored, for example, in the <r,g,b> components by modifying the lighting equation to use only the diffuse term and by applying the lighting equation for six colored lights directed along the local axes of the object coordinate space. For example, the x direction light is colored red, the y direction light is colored green, and the z direction light is colored blue, so that the directional components of the pixels match their color components. Then the lighting equation is written as a summation of dot products scaled by the respective color of the light. This results in normal values which may be used, for example, for smooth force shading.

Data contained in the depth buffer 125, feedback buffer 130, color buffer 135, stencil buffer 140, and/or accumulation buffer 145, among other data buffers, may be altered by hardware such as a graphics card. A graphics card can perform some of the graphical data processing required to produce 2D screen views of 3D objects, thereby saving CPU resources. Data produced from such hardware-accelerated geometry modifications 150 is used in certain embodiments of the invention. Modern graphics cards have the ability to execute custom fragment and vertex shading programs, enabling a programmable graphics pipeline. It is possible to leverage the results of such geometry modifications for purposes of haptic rendering. For example, view-dependent adaptive subdivision and view-dependent tessellation be used to produce smoother-feeling surfaces. Displacement mapping can result in the haptic rendering of surface details such as ripples, crevices, and bumps, which are generated onboard the graphics card.

In one embodiment, an "adaptive viewport" is used to optimize depth buffer haptic rendering, wherein the bounds of the viewport are read-back from the graphics card. For example, the entire viewport may not be needed; only the portion of the depth buffer that contains geometry within the immediate vicinity of the haptic interface location may be needed. In an adaptive viewport approach, the bounds of the viewport that are to be read-back from the graphics card are determined by projecting the haptic interface location onto the near plane and by determining a size based on a workspace to screen scale factor. In this way, it is possible to ensure that enough depth buffer information is obtained to contain a radius of workspace motion mapped to screen space.

Certain 3D graphics API's, for example, OpenGL, offer a mode of operation called feedback mode, which provides access to the feedback buffer 130 (FIG. 1) containing information used by the rasterizer for scan-filling primitives to the viewport. In one embodiment, the method of FIG. 1 includes the step of accessing the feedback buffer 130 and interpreting the data from the feedback buffer for haptic use. The feedback buffer 130 provides access to the primitives within a view volume. The view volume may be sized to include only portions of the virtual environment of haptic interest. Therefore, haptic rendering of primitives outside the view volume need not take place, and valuable processing resources are saved.

It is possible to simulate non-uniform surface properties using data in the feedback buffer 130 via groups of primitives, per vertex properties, and/or via texture mapping. In certain embodiments, the feedback buffer provides data that is more precise than depth buffer data, since primitives in the feedback buffer have only undergone a linear transformation, whereas the depth buffer represents rasterized primitives, thereby possibly introducing aliasing errors.

Step 105 of the method of FIG. 1 is directed to interpreting the graphical rendering data accessed in step 102 for haptic use. In one embodiment, step 105 involves performing an intersection test 160 to determine an intersection point and a normal in screen space, and transforming the intersection point coordinates and normal coordinates to object space 165. The point and normal together define a local plane tangent to the surface of the virtual object. In one embodiment in which a depth values from a depth buffer 125 are used, the intersection test of step 160 is essentially a pixel raycast along a line segment, where the depth buffer is treated as a height map. A line segment that is defined in object space is transformed into screen space and tested against the height map to find an intersection. An intersection is found by searching along the line segment (in screen space) and comparing depth values to locations along the line segment. Once a crossing has been determined, a more precise intersection can be determined by forming triangles from the local depth values. This provides an intersection point and an intersection normal, where the intersection normal is normal to a surface corresponding to the screen space height map at the intersection point. In step 165, the intersection point and normal are transformed back into object space to be used as part of a haptic rendering method. Example haptic rendering methods are described in co-owned U.S. Pat. Nos. 6,191,796 to Tarr, 6,421,048 to Shih et al., 6,552,722 to Shih et al., 6,417,638 to Rodomista et al., and 6,671,651 to Goodwin et al., the disclosures of which are incorporated by reference herein in their entirety.

In one embodiment in which screen space rasterization primitives 130 are accessed in step 102 in the method of FIG. 1, the intersection test of step 160 also involves transforming a line segment from object space to screen space and performing a line intersection test against candidate primitives. An intersection point and intersection normal are found along the line segment and are transformed back into object space for haptic rendering.

Step 110 of the method of FIG. 1 is directed to haptically rendering one or more virtual objects in the virtual environment using the interpreted data from step 105. In one embodiment, the haptic rendering step includes determining a haptic interface location in the virtual environment corresponding to a user's position in real space (i.e. via a user's manipulation of a haptic interface device) 170, locating one or more points on the surface of one or more virtual objects in the virtual environment (i.e. the surface point nearest the haptic interface location) 175, and determining an interaction force 180 according to the relationship between the haptic interface location and the surface location(s). Thus, step 110 may involve determining when a collision occurs between a haptic interface location (i.e. a virtual tool location) and a virtual object. In one embodiment, a collision occurs when the haptic interface location crosses through the surface of a virtual object. The interaction force that is determined in step 180 may be delivered to the user through the haptic interface device. The determination and delivery of a feedback force to a haptic interface device is described, for example, in co-owned U.S. Pat. Nos. 6,191,796, 6,421,048, 6,552,722, 6,417,638, and 6,671,651, the disclosures of which are incorporated by reference herein in their entirety.

Figure 2:
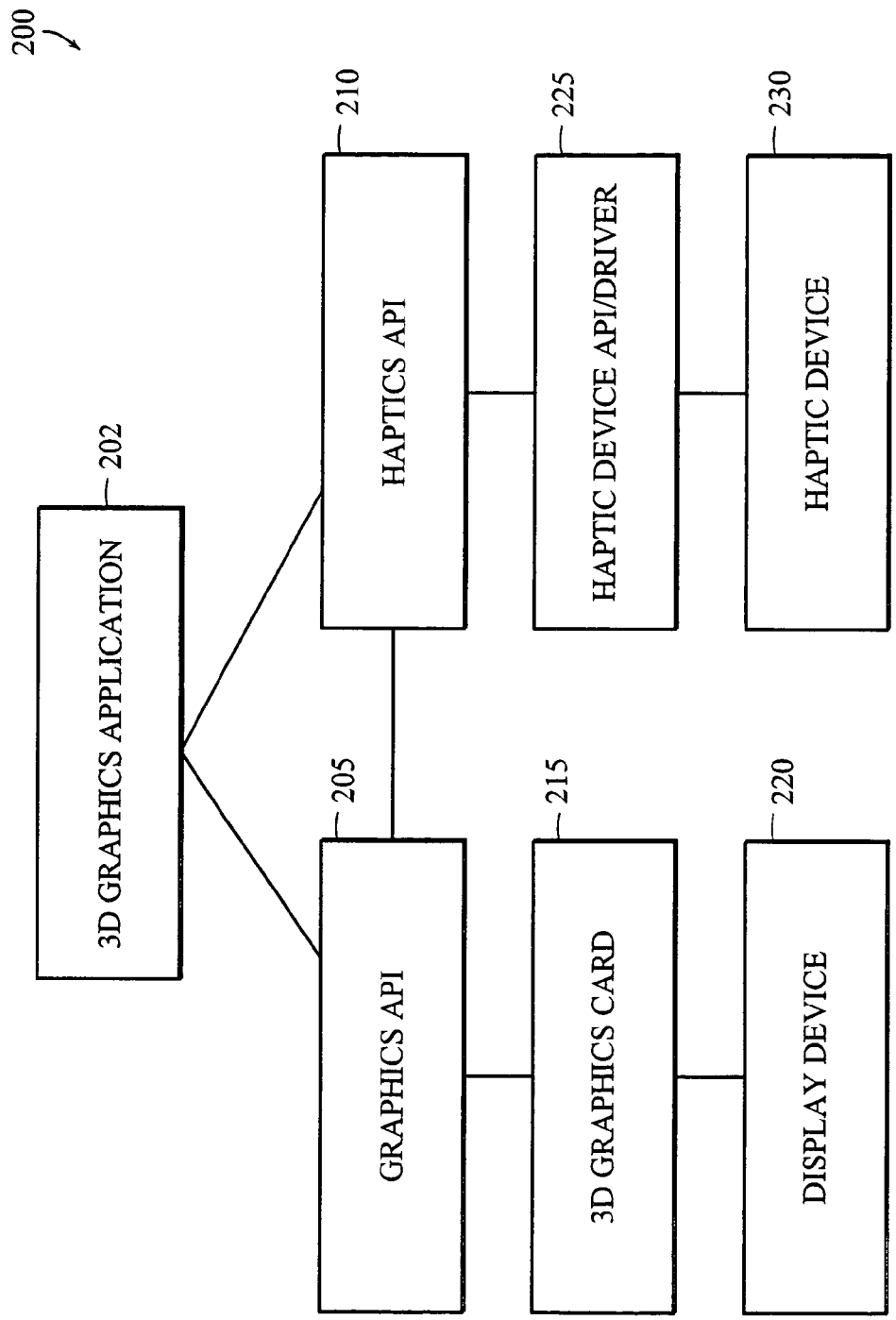
FIG. 2 is a schematic diagram illustrating a system for haptically rendering a virtual environment using data in a graphics pipeline, the diagram showing an interaction between a 3D graphics application, a graphics application programming interface (API), a 3D graphics card, and a haptics API, according to an illustrative embodiment of the invention.

FIG. 2 is a schematic diagram 200 illustrating, in a simplified way, a system for haptically rendering a virtual environment using data in a graphics pipeline. The diagram shows an interaction between a 3D graphics application 202, a graphics application programming interface (API) 205, a 3D graphics card 215, and a haptics API 210. Certain methods of the invention may be embodied in, and may be performed using, the haptics API 210, the graphics API 205, the 3D graphics application 202, and/or combinations thereof.

A 3D graphics application 202 may be written or adapted to enable the user of the application to see a visual representation of a 3D virtual environment on a two-dimensional screen while "feeling" objects in the 3D virtual environment using a peripheral device, such as a haptic interface device. The graphics application makes function calls referencing function libraries in a graphics API 205. The graphics API communicates with the 3D graphics card 215 in order to graphically render a virtual environment. A representation of at least a portion of the virtual environment is displayed on a display device 220.

The system 200 of FIG. 2 permits a programmer to write function calls in the 3D graphics application 202 to call a haptics API 210 for rendering a haptic representation of at least a portion of the virtual environment. The haptics API 210 accesses graphical rendering data from the 3D graphics pipeline by making function calls to the graphics API. The graphical data may include a data buffer, such as a depth buffer or feedback buffer. The system 200 interprets the graphical data to haptically render at least a portion of the virtual environment. The haptic rendering process may include determining a force feedback to deliver to the user via a haptic interface device 230. A haptic device API and a haptic device driver 225 are used to determine and/or deliver the force feedback to the user via the haptic interface device 230.

The haptics API 210 performs high-level haptics scene rendering, and the haptic device API 225 performs low-level force rendering. For example, the high-level haptics API 210 provides haptic rendering of shapes and constraints and the low-level haptic device API 225 queries device state, sends forces, and/or performs thread control, calibration, and error handling. The 3D graphics application may make direct calls to either or both the haptics API 210 and the haptic device API 225.

Figure 3:
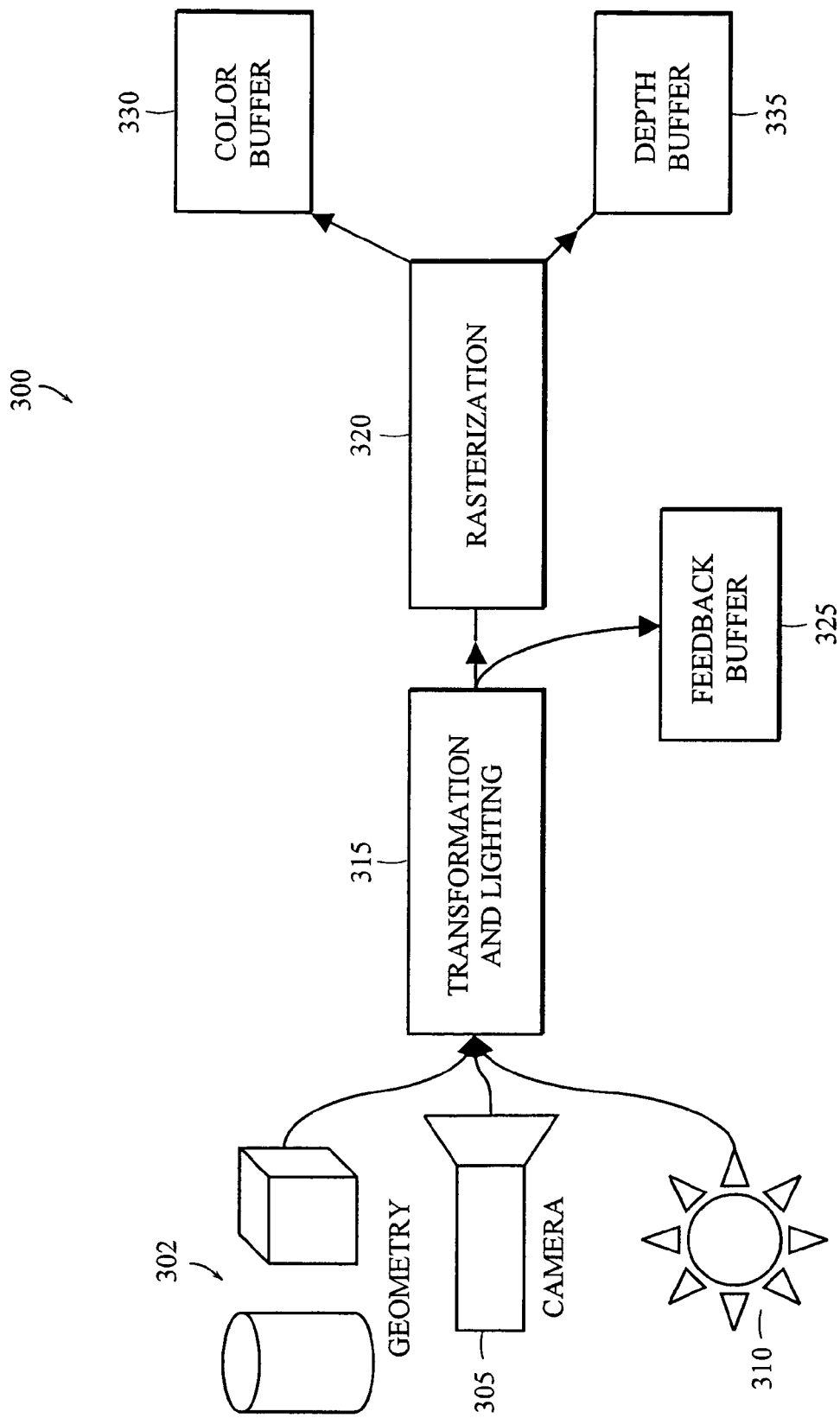
FIG. 3 is a schematic diagram illustrating a graphics pipeline of a 3D graphics application, according to an illustrative embodiment of the invention.

FIG. 3 illustrates a 3D graphics pipeline 300, in which graphical data describing one or more 3D objects in a virtual environment is used to create a 2D representation for display on a two-dimensional screen. Graphical data corresponding to the scene geometry 302, a camera view 305, and lighting 310, undergoes a series of transformations 315. The resultant primitives data then undergoes a rasterization process 320, producing 2D graphical data that may be stored in 2D buffers, for example, a color buffer 330 and a depth buffer 335. The primitives data as it exists prior to rasterization can be accessed, for example, via a feedback buffer 325. Methods of the invention use the graphical data in the 3D graphics pipeline 300, for example, the feedback buffer 325, the depth buffer 335, and the color buffer 330, for haptically rendering the virtual environment, as described in more detail herein.

Figure 4A:
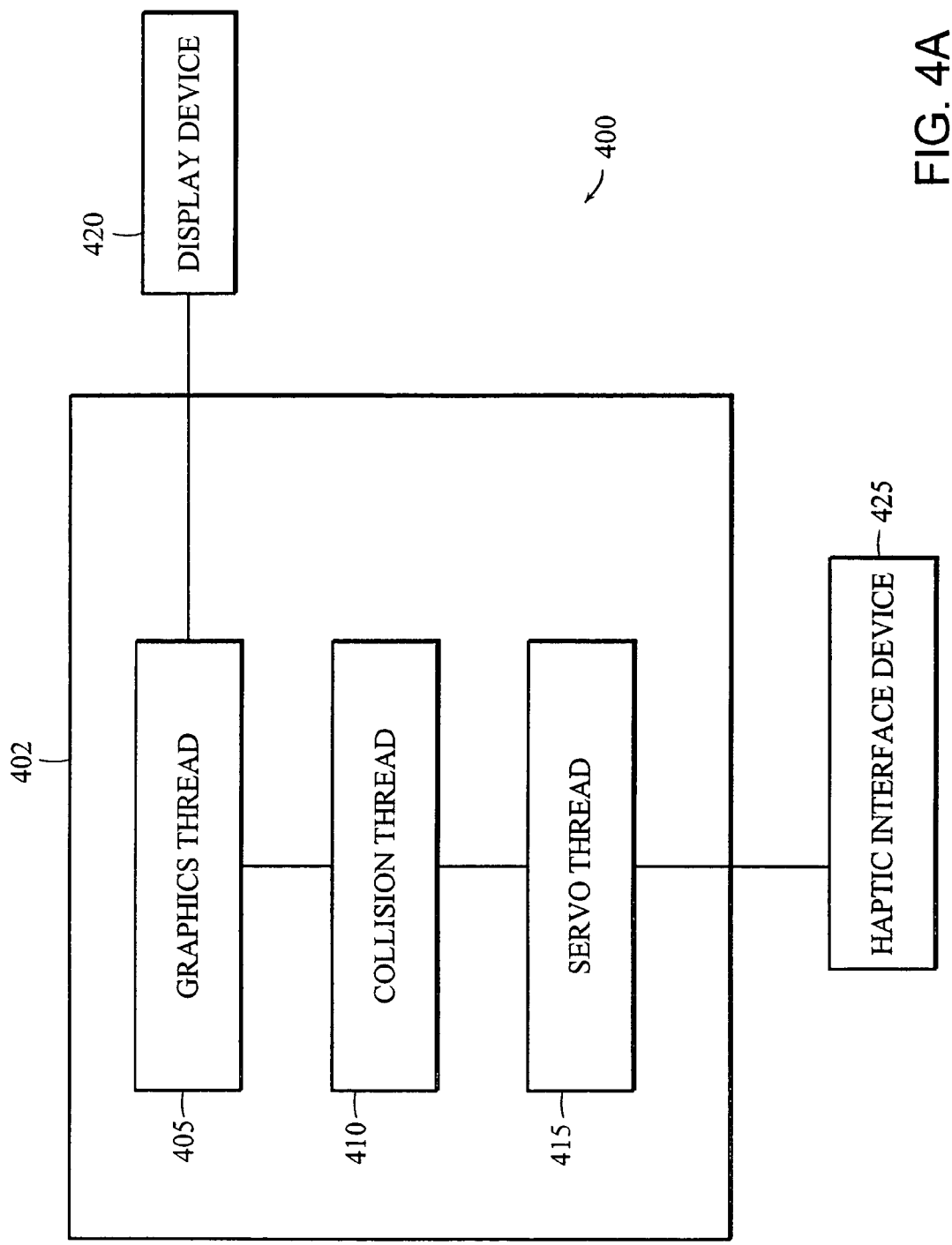
FIG. 4A is a schematic diagram illustrating a system for haptically rendering a virtual environment using data in a graphics pipeline, the system including a graphics thread, a collision thread, and a servo thread, according to an illustrative embodiment of the invention.

FIG. 4A is a simplified schematic diagram illustrating components of a system 400 for haptically rendering a virtual environment using data in a graphics pipeline. The system 400 comprises computational elements 402 including a graphics thread 405, a collision thread 410, and a servo thread 415, as well as a display device 420 and a haptic interface device 425. The graphics thread 405 is adapted to generate a visual display of a virtual environment to be displayed on the display device 420. The collision thread 410 determines if a user-directed virtual proxy (i.e. a haptic interface location) collides with a surface within the virtual environment, based on input from the graphics thread 405. The servo thread 415 determines (and may generate) a force to be applied to a user in real space via the haptic interface device 425 according to input from the collision thread 410.

Figure 4B:
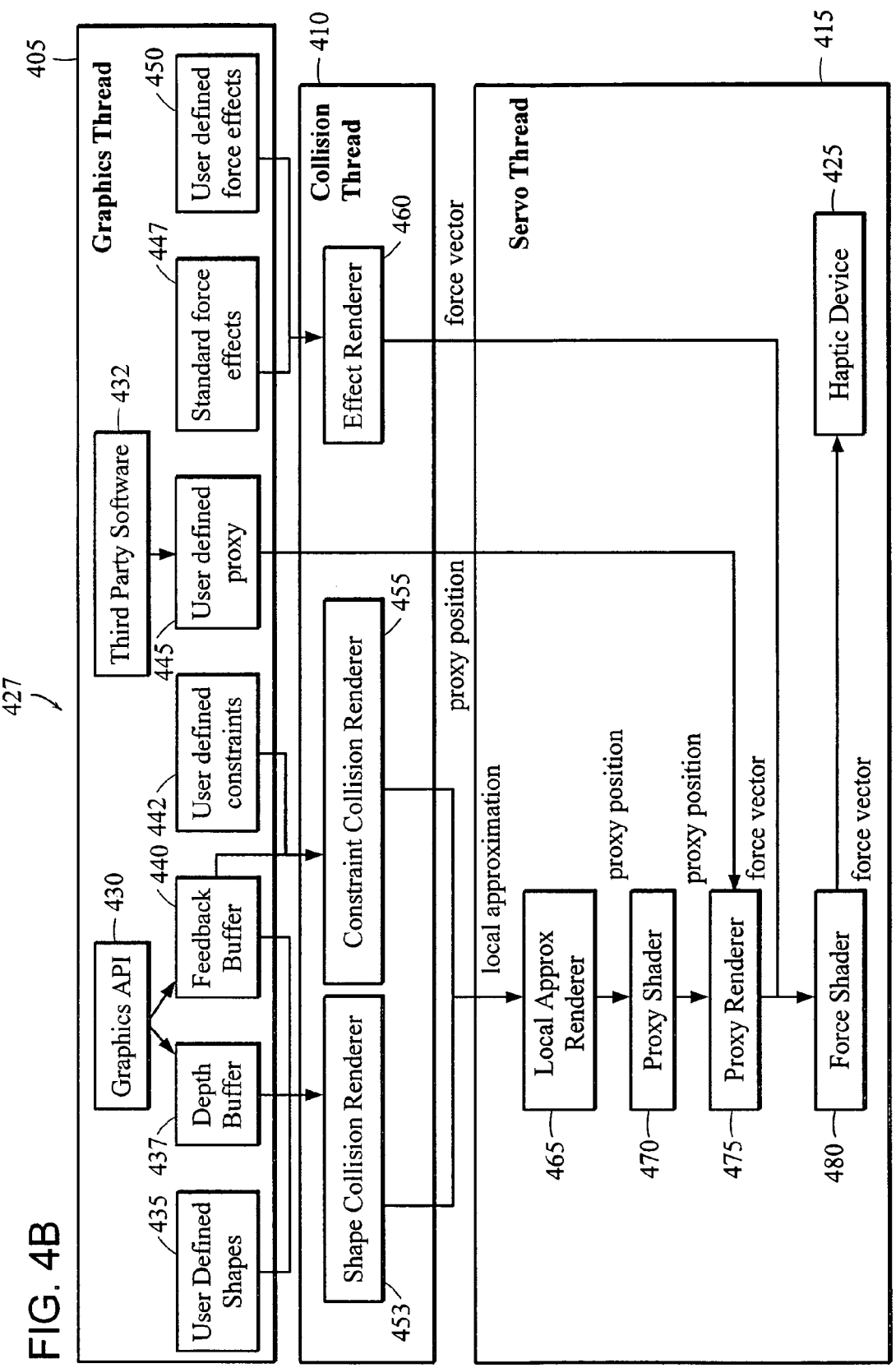
FIG. 4B is a schematic diagram illustrating the system of FIG. 4A in further detail, according to an illustrative embodiment of the invention.

FIG. 4B is a schematic diagram 427 illustrating the system of FIG. 4A in further detail. The graphics thread 405 is adapted to generate a visual display of a virtual environment. API commands 430 are used to access graphical rendering data, including the depth buffer 437 and feedback buffer 440. In one embodiment, this data is used for both haptic and graphical rendering. Additionally, the user (and/or the 3D graphics software programmer) may define custom shapes 435 and custom constraints 442 independent of the graphics API 430. Custom shapes 435 include, for example, NURBS shapes, SubDs, voxel-shapes, and the like. Custom constraints include, for example, constraint to surfaces, lines, curves, arcs, and the like. Standard force effects 447 and user-defined force effects 450 may also be assigned in the graphics thread 405. Additional software, for example, third-party software, may be integrated with the graphics thread 405, for example, in a user-defined proxy module 445. In certain embodiments, the graphics thread 405 refreshes the display device 420 at a rate, for example, within the range from about 10 Hz to about 150 Hz, within the range from about 20 Hz to about 110 Hz, or, preferably, within the range from about 30 Hz to about 60 Hz. Rates above and below these levels are possible as well.

The collision thread 410 of FIG. 4B is adapted to determine whether a user-directed virtual proxy collides with a surface within the virtual environment. In one embodiment, the collision thread comprises three modules, including a shape collision renderer 453, a constraint collision renderer 455, and an effect renderer 460. The shape collision renderer 453 is adapted to calculate the shapes in the virtual environment and to identify their collision with each other or with proxies. The shape collision renderer 453 may use data from the depth buffer 437, the feedback buffer 400, and user defined shape data 435. Similarly, the constraint collision renderer 455 may use data from the depth buffer 437, feedback buffer 440, and from user-defined constraints 442. The effect renderer 460 may use data from the standard force effects module 447 and from the user-defined force effects module 450. One of the functions of the effect renderer 460 is to compose the force shader 480 in the servo thread 415, so that the force shader 480 is able to simulate force effects at the typically higher servo loop rate. For example, the effect renderer 460 can start, stop, and manage parameters for the force shader 480. In certain embodiments, the collision thread 410 may perform a collision detection computation at a rate within the range from about 10 Hz to about 200 Hz, from about 80 Hz to about 120 Hz, or, preferably, at about 100 Hz. Rates above and below these levels are possible as well.

Next, the servo thread 415 generates a force to be applied to a user in real space via the haptic interface device 425 according to input from the collision thread 410. The force is calculated by using data from the shape collision renderer 453 and from the constraint collision renderer 455. Data from these two renderers are used to calculate a local approximation, which is transmitted to the local approximation renderer 465. The local approximation renderer 465 resolves a position/orientation transform for the proxy, which is used for producing a contact or constraint force. The proxy can be represented by the position of a single point, but can alternatively be chosen as having any arbitrary geometry. The local approximation transmitted to the local approximation renderer 465 is a collection of geometry determined in the collision thread generally at a lower processing rate than the servo thread. This local approximation geometry may be used for several updates of the servo loop thread. The local approximation geometry generally serves as a more efficient representation for collision detection and resolution than the source geometry processed by the collision thread. The proxy position information is transmitted to a proxy shader 470 and then to a proxy renderer 475, along with the user-defined proxy information 445 from the graphics thread.

In one embodiment, a force shader 480 enables modification of a calculated force vector prior to transmitting the force vector to the haptic interface device 425. For example, rendered proxy data from the proxy renderer 475, along with force vector data from the effect renderer 460, are used by the force shader 480 to calculate a modified force vector, which is then transmitted to the haptic interface device 425. The force shader 480 is thus able to modify the direction and magnitude of the force vector as determined by preceding modules such as the proxy renderer 475 and the effect renderer 460. The force shader 480 may also have access to data from other modules in the schematic diagram 427 of FIG. 4B, such as the local approximation renderer 465 and the proxy shader 470. The force shader 480 may be used for simulating arbitrary force effects. Examples of such force effects include inertia, viscosity, friction, attraction, repulsion, and buzzing.

The force shader 480 may also be used for modifying the feel of a contacted surface. For example, the force shader 480 may be used to simulate a smooth surface by modifying the force vector direction so that it is smoothly varying while contacting discontinuous surface features. As such, force discontinuities apparent when transitioning from one polygonal face to another may be minimized by the force shader 480 by aligning the force vector to an interpolated normal based on adjacent faces. The force shader 480 may also be used for general conditioning or filtering of the computed force vector, such as clamping the magnitude of the force vector or increasing the magnitude of the force vector over time. In one embodiment, the force shader is used to reduce the magnitude and directional discontinuities over time, which can result from instabilities in the control system or mechanical instabilities in the haptic interface device 425.

The servo thread 415 may refresh the force to be applied through the haptic interface device 425 at a rate within the range from about 500 Hz to about 15,000 Hz, from about 1000 Hz to about 10,000 Hz, or from about 2000 Hz to about 6000 Hz. Rates above and below these levels are possible as well.

In one embodiment, a scheduler interface manages the high frequency for sending forces and retrieving state information from the haptic interface device 425. The scheduler allows the 3D graphics application to communicate effectively with the servo thread in a thread-safe manner and may add and delete operations to be performed in the servo thread. Furthermore, in one embodiment, a calibration interface allows the system to maintain an accurate estimate of the physical position of the haptic interface device 425. Calibration procedures may be manual and/or automatic.

Figure 5:
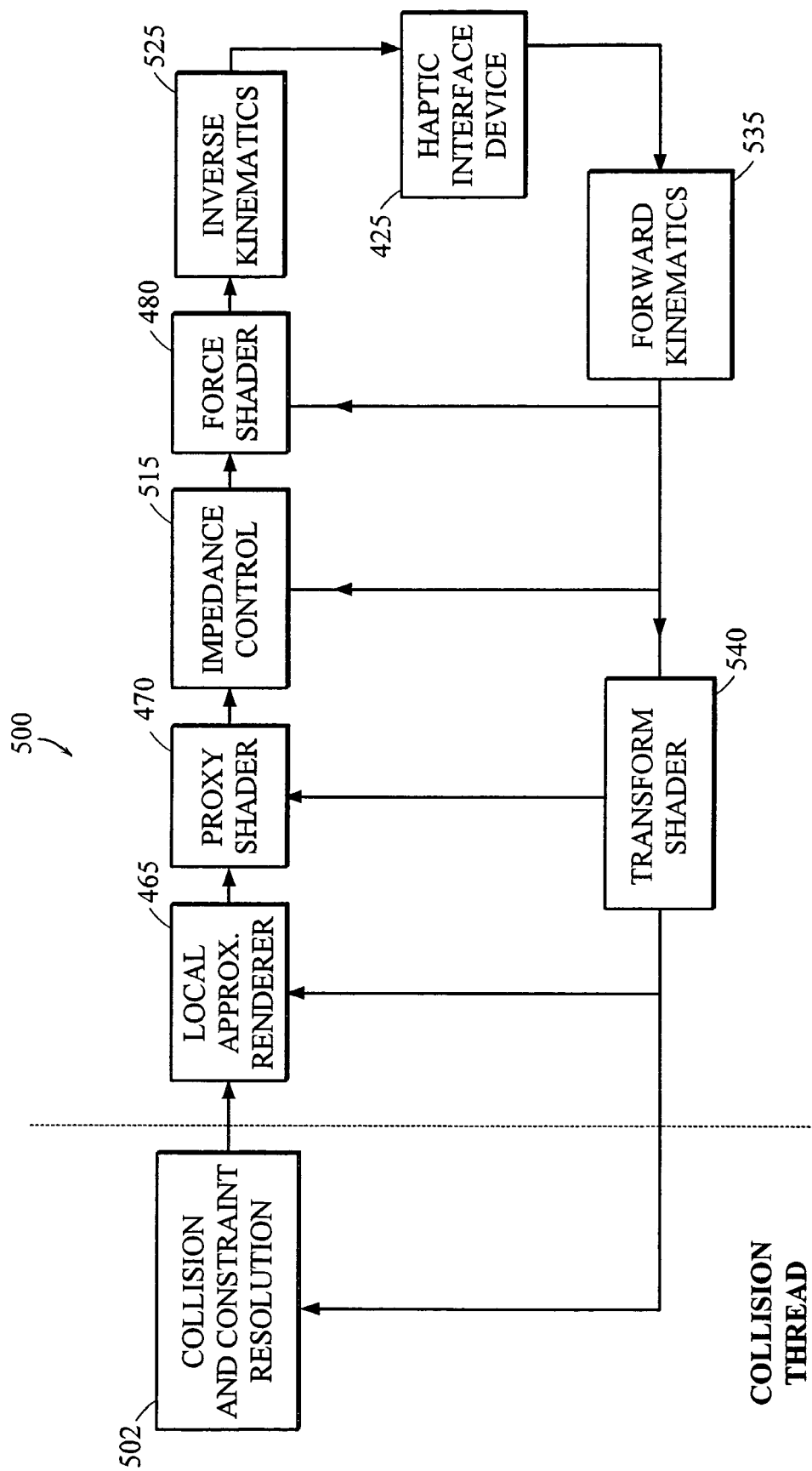
FIG. 5 is a schematic diagram illustrating a servo thread of a haptics rendering pipeline, according to an illustrative embodiment of the invention.

FIG. 5 is a schematic diagram 500 illustrating a servo thread of an illustrative haptics rendering pipeline. Collision and constraint resolution data 502 from the virtual environment is transmitted from the collision thread to the local approximation renderer 465. The local approximation renderer 465 calculates a proxy position, which is then transmitted to a proxy shader 470 and then to impedance control 515, producing a force. The force is modified by the force shader 480, then transmitted to the haptic interface device 425 following application of inverse kinematics 525. Forward kinematics 535 from the haptic interface device 535 is fed back to the force shader 480 and the impedance controller 515, and is transmitted to a transform shader 540, which provides feedback to the local approximation renderer 465 and proxy shader 470.

Figure 6:
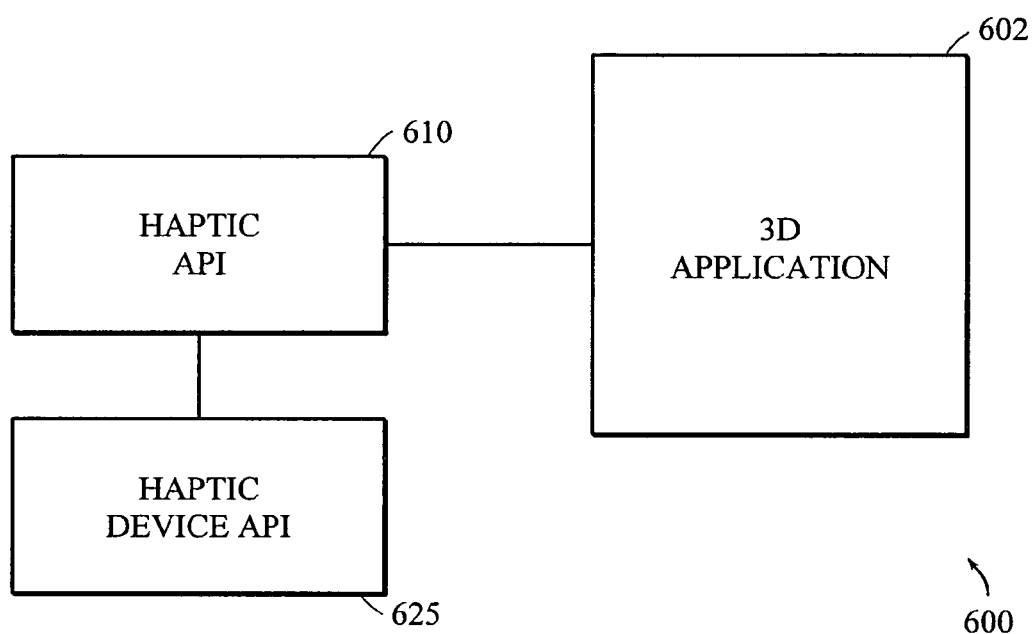
FIG. 6 is a schematic diagram illustrating a system for haptically rendering a virtual environment using data in a graphics pipeline, the diagram showing how third-party 3D graphics application software is integrated with the system, according to an illustrative embodiment of the invention.

FIG. 6 is a schematic diagram 600 illustrating a system for haptically rendering a virtual environment using data in a graphics pipeline of a 3D graphics application. The diagram 600 shows how third-party 3D graphics application software is integrated with the system. The diagram 600 illustrates the interaction between the 3D graphics application 602, a haptics API 610, and a haptic device API 625. The graphics application 600 can make a function call to the haptics API 610. The haptics API 610 then accesses data from the 3D graphics pipeline. The haptics API 610 also transmits data to the haptic device API 625, which performs low-level force rendering.

Figure 7:
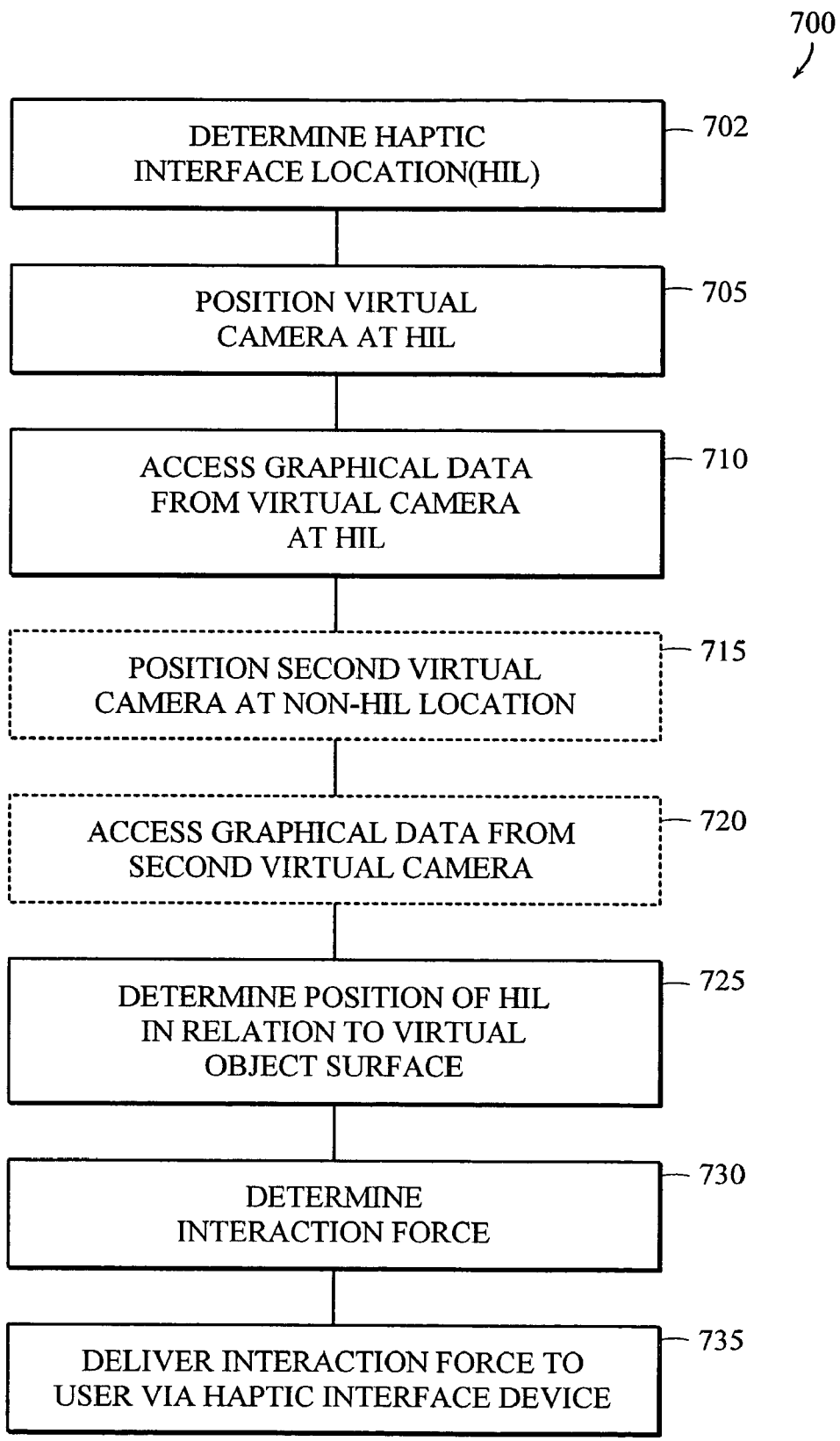
FIG. 7 is a block diagram featuring a method of delivering interaction force to a user via a haptic interface device, the force based at least in part on graphical data from a virtual camera located at a haptic interface location, according to an illustrative embodiment of the invention.

FIG. 7 is a block diagram 700 featuring a method of delivering interaction force to a user via a haptic interface device, where the force is based at least in part on graphical data from a virtual camera located at a haptic interface location. The method includes determining a haptic interface location in a 3D virtual environment corresponding to the position of a haptic interface device in real space 702. The method further includes positioning a first virtual camera at the haptic interface location 705. The first virtual camera is usually implemented using matrix transformations that map 3D virtual objects in coordinate space into a 2D representation, so that the virtual environment, populated with the virtual objects, appears as if viewed by a camera. By modifying these transformations, the virtual camera view can be changed to view the same object from any of a plurality of vantage points. These transformations include a modeling transformation, a viewing transformation, a projection transformation, and a display device transformation. These are discussed in further detail with respect to FIG. 9 herein below. Furthermore, the position of the first camera is updated as the haptic interface location changes, according to the manipulation of the haptic interface device by the user.

The method of FIG. 7 next includes the step of accessing graphical data corresponding to the virtual environment as viewed from the first virtual camera at the haptic interface location 710. The accessed data is then used in the graphical rendering of the virtual environment, for example, according to methods described herein.

The method of FIG. 7 may optionally include the step of positioning a second virtual camera at a location other than the haptic interface location 715. The method would then comprise the step of accessing graphical data from the second virtual camera 720. The accessed data may be used for graphical rendering, haptic rendering, or both. In one embodiment, the second virtual camera is used for graphical rendering, while the first virtual camera is used for haptic rendering. The second camera may move, or it may be static. In one embodiment, the second virtual camera is fixed while the first virtual camera is capable of moving. The second virtual camera operates using matrix transformations as described with respect to step 705. The second virtual camera has associated with it a look direction and an eye position, independent of the look direction and eye position of the first virtual camera.

Figure 8A:
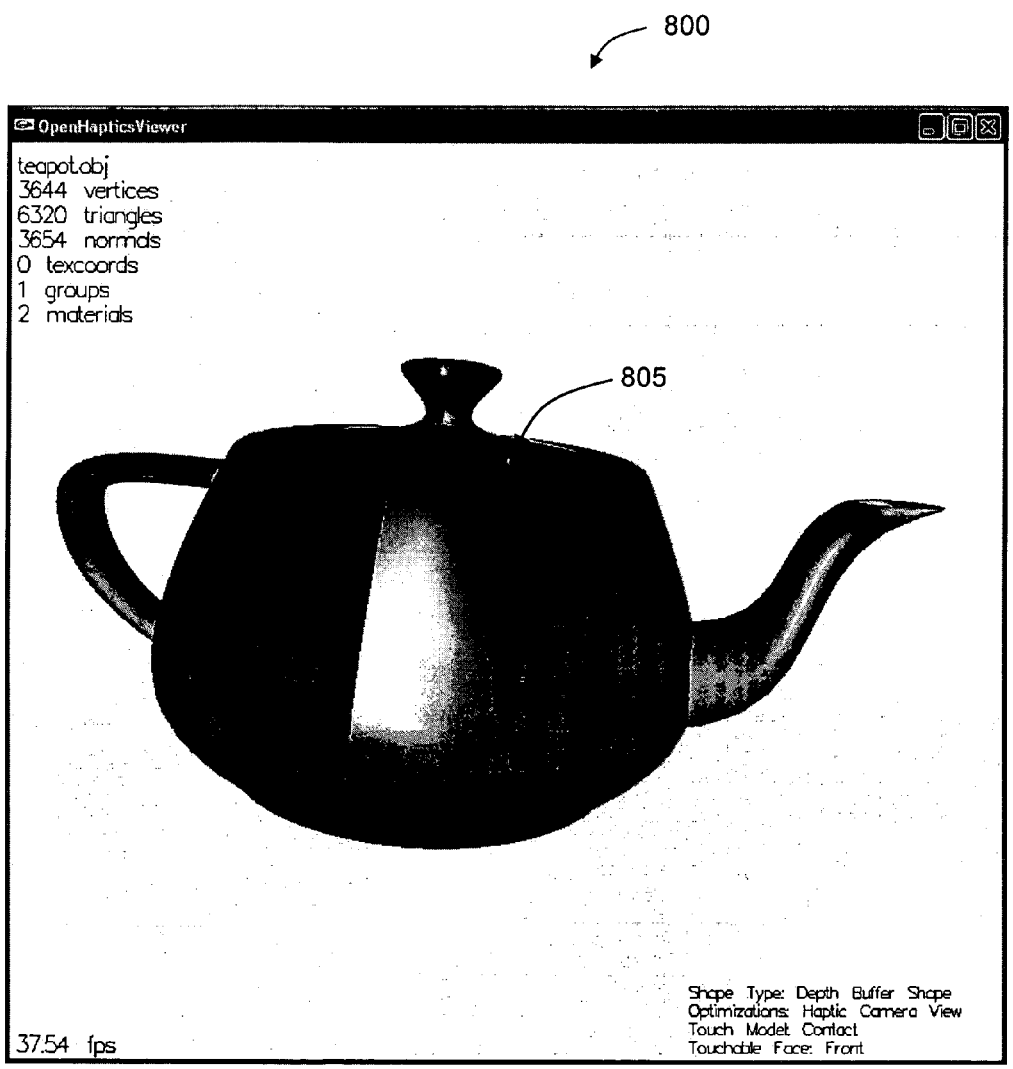
FIG. 8A is a screenshot of a virtual object in a virtual environment as imaged from a fixed camera view, the screenshot indicating a haptic interface location, or proxy position, representing the position of a user in the virtual environment, according to an illustrative embodiment of the invention.
Figure 8B:
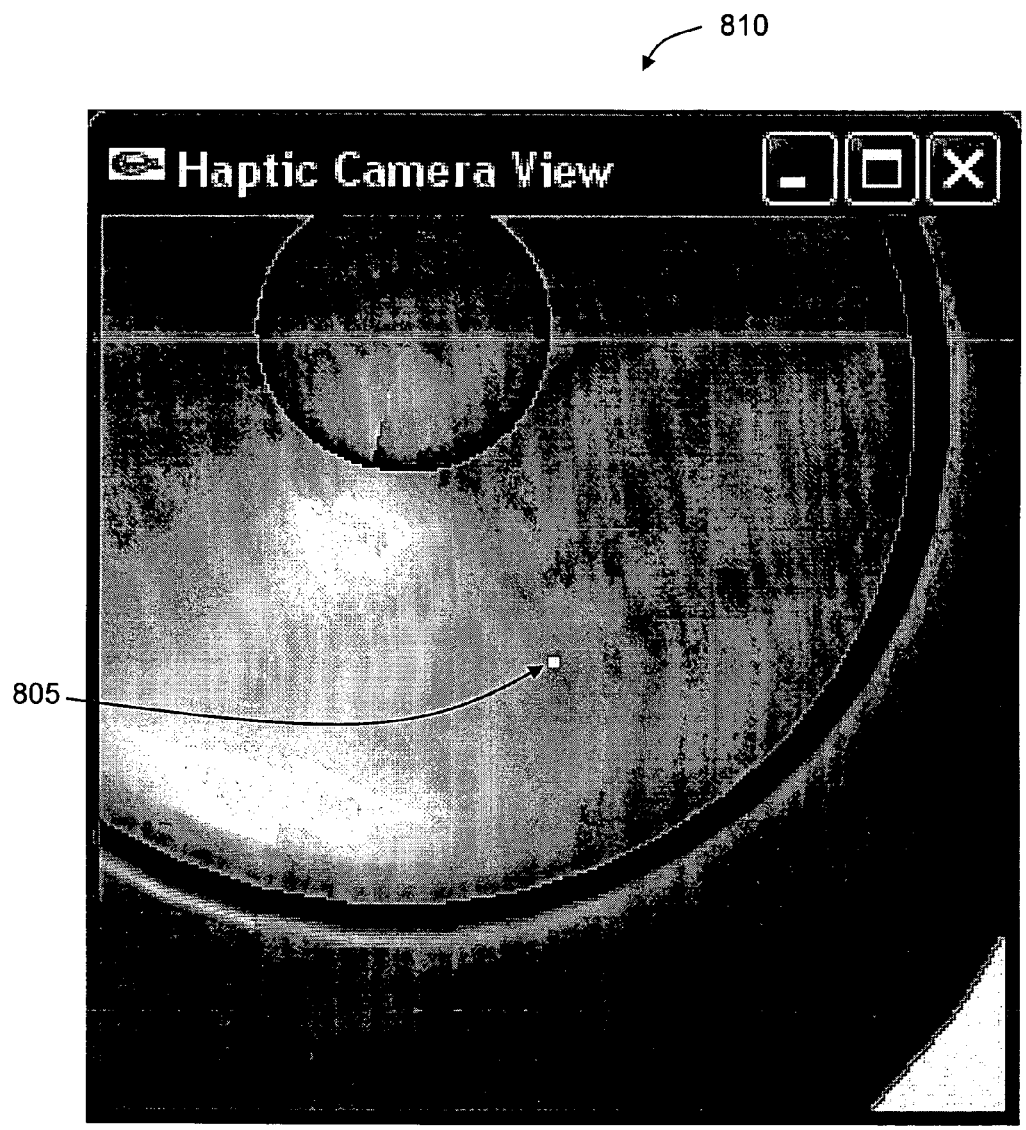
FIG. 8B is a screenshot of the virtual object of FIG. 8A as imaged from a moving camera view located at the haptic interface location shown in FIG. 8A, where graphical data from the images of either or both of FIG. 8A

FIG. 8A is a screenshot 800 of a virtual object (a teapot) in a virtual environment as imaged from a fixed camera view (i.e. the second camera view, as described with respect to FIG. 7). The screenshot 800 shows a haptic interface location 805, representing the position of a user in the virtual environment. A "haptic camera" (first virtual camera) is located at the haptic interface location, which moves as a user manipulates a haptic interface device in real space. FIG. 8B is a screenshot 810 of the virtual object of FIG. 8A as imaged from the moving haptic camera. As can be seen from the screenshot 810, additional detail is viewable from this vantage point. It is possible to haptically render the virtual object using the graphical data from the haptic camera. Efficiency is improved by limiting the information that is haptically rendered to only those parts of the virtual environment that can be "touched" by the user at any given time. Furthermore, geometry that is not visible from the second camera view (i.e. dedicated to providing a graphical display of the virtual environment) can be "felt" using graphical data from the haptic camera view. The user can feel behind the displayed teapot.

The view volume of the haptic camera may be optimized so as to view only areas of the virtual environment the user will want to touch or will be able to touch at any given time. For example, the view volume of the first virtual camera, dedicated to haptic rendering, may be limited to objects within the vicinity and trajectory of the haptic interface. As a result, haptic rendering will only need to be performed for this limited view volume, and not for all the geometry that is viewed from the vantage point of a graphics-dedicated second virtual camera. The method thereby increases the efficiency of the haptic rendering process.

Additionally, the method of FIG. 7 comprises determining a position of the haptic interface location in relation to a surface of a virtual object in the virtual environment by using graphical data from either or both of the first virtual camera and the second virtual camera 725. The method also includes determining an interaction force based at least in part on the position of the haptic interface location in relation to the surface of the virtual object 730. Finally, an interaction force is delivered to a user through the haptic interface device 735. The determination and delivery of an interaction force is described, for example, in U.S. Pat. Nos. 6,191,796, 6,421, 048, 6,552,722, 6,417,638, and 6,671,651, the disclosures of which are incorporated by reference herein in their entirety.

Figure 9:
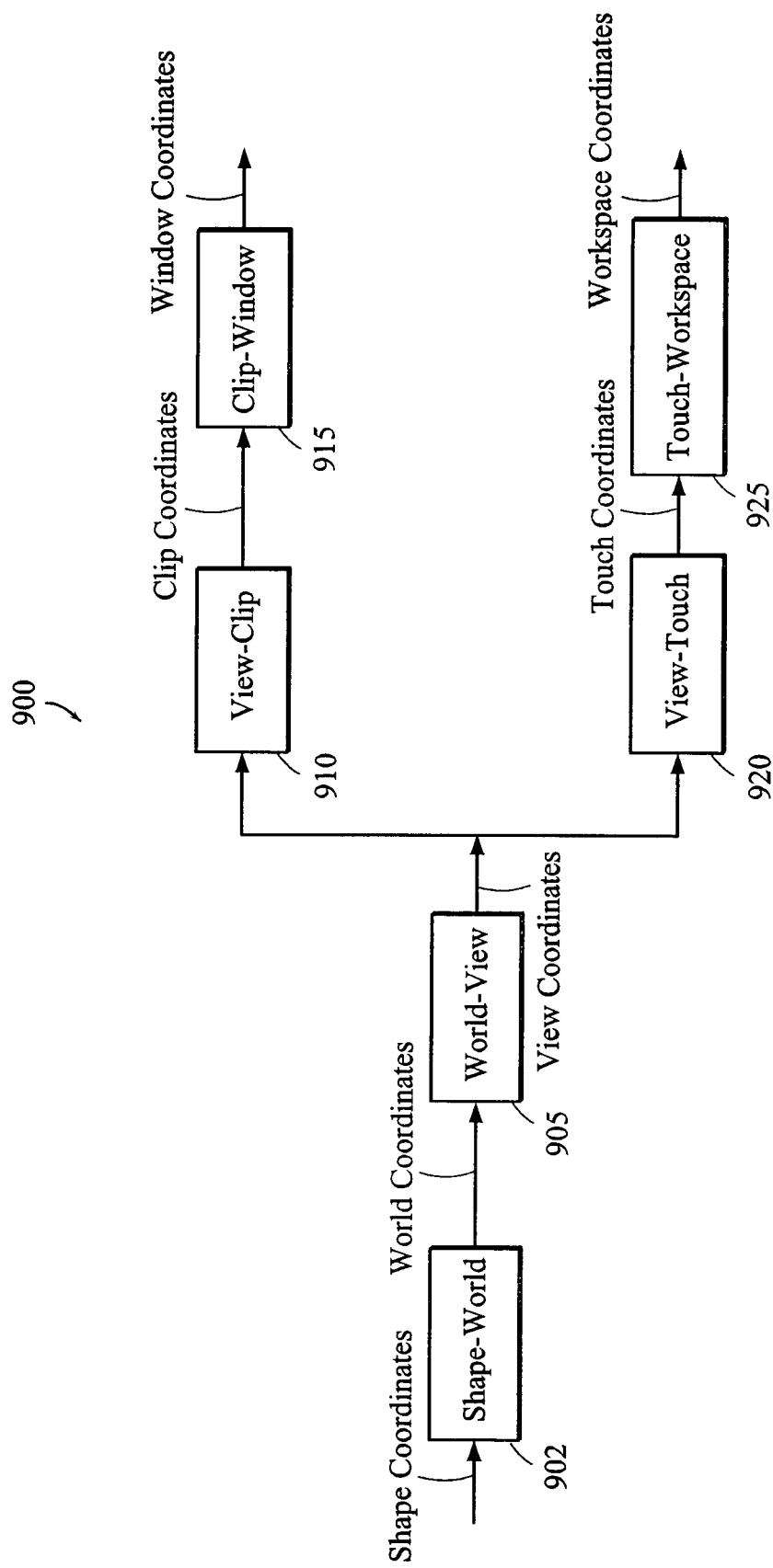
FIG. 9 is a block diagram featuring a 3D transformation pipeline for displaying 3D model coordinates on a 2D display device and for haptic rendering via a haptic interface device, according to an illustrative embodiment of the invention.

FIG. 9 is a schematic diagram 900 illustrating a 3D transformation pipeline. 3D graphics applications generally perform a series of transformations in order to display 3D model coordinates on a 2D display device. These transformations include a shape-world transformation 902, a world-view transformation 905, a view-clip transformation 910, and a clip-window transformation 915. Additional transformations that are used to haptically render a virtual environment via a haptic interface device include a view-touch transformation 920 and a touch-workspace transformation 925. The transformations in FIG. 9 can be repurposed for rendering a scene from a virtual haptic camera viewpoint, thereby affording improved acquisition and utilization of graphics pipeline data.

The shape-world transformation 902 of the pipeline of FIG. 9 transforms geometry describing a virtual object from its local coordinate space, or shape coordinates, into world coordinates, i.e., the main reference coordinate space for the 3D virtual environment. All objects in the virtual environment have a relationship to world coordinates, including cameras.

Figure 10:
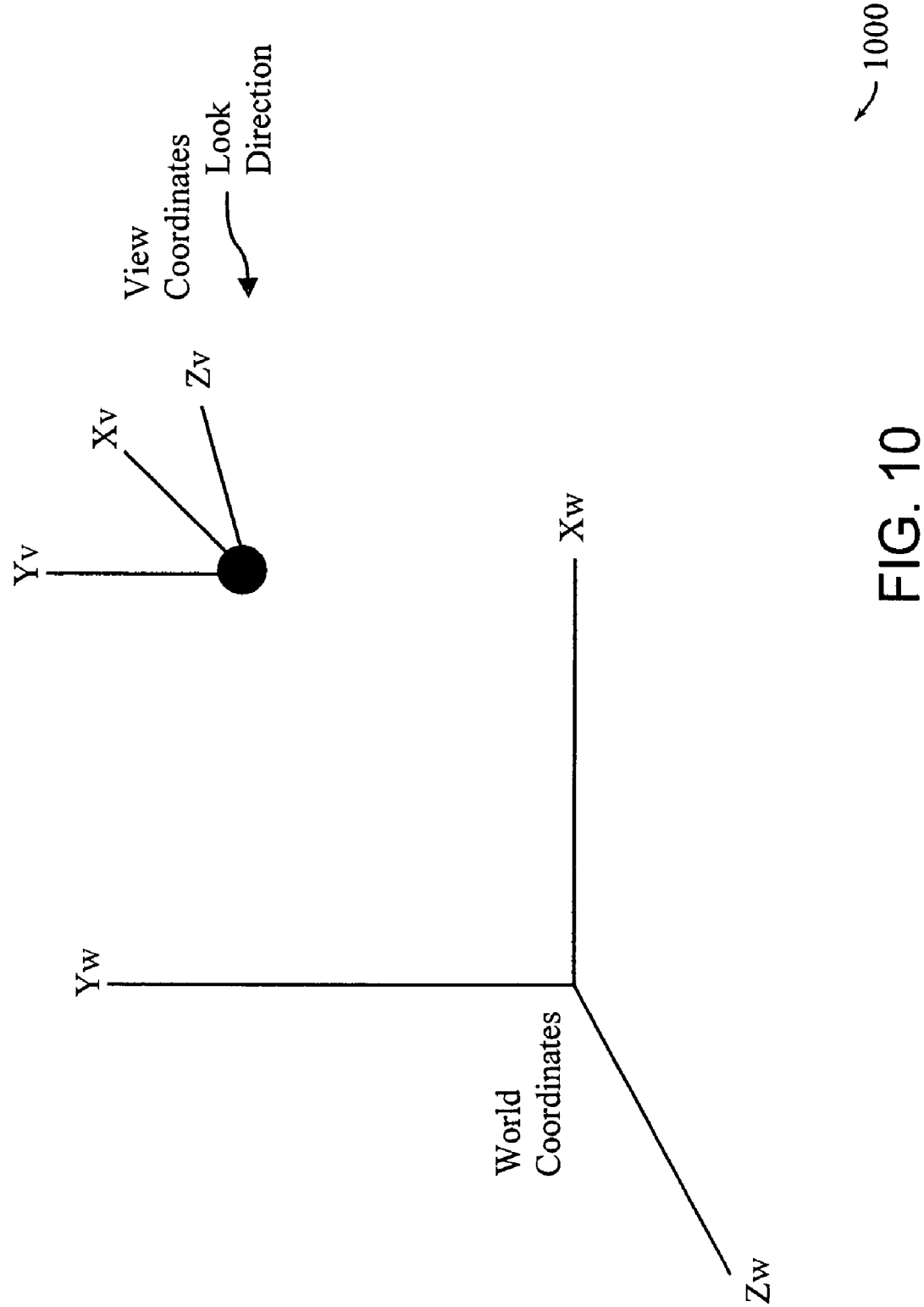
FIG. 10 is a schematic diagram illustrating the specification of a viewing transformation for a haptic camera view, according to an illustrative embodiment of the invention.

The world-view transformation 905 of the pipeline of FIG. 9 maps world coordinates to view coordinates, the local coordinates of the virtual camera. FIG. 10 illustrates the relation of view coordinates ($X_V$, $Y_V$, $Z_V$), with an associated look direction and camera eye position, to world coordinates ($X_W$, $Y_W$, $Z_W$). The look direction of FIG. 10 is preferably mapped to the z-axis of the world-view transform. The world-view transformation can be customized for translating and rotating the virtual camera so that it can view the scene as if attached to the position of the haptic device's virtual proxy.

Furthermore, where the virtual camera is a haptic camera as described above, the camera eye position of the world-view transformation is sampled from the virtual proxy position. In order to avoid undesirable jitter, the camera eye position is preferably only updated when the virtual proxy moves beyond a threshold distance from the current eye position. In one embodiment, for example, the threshold distance is 2 mm.

Figure 11:
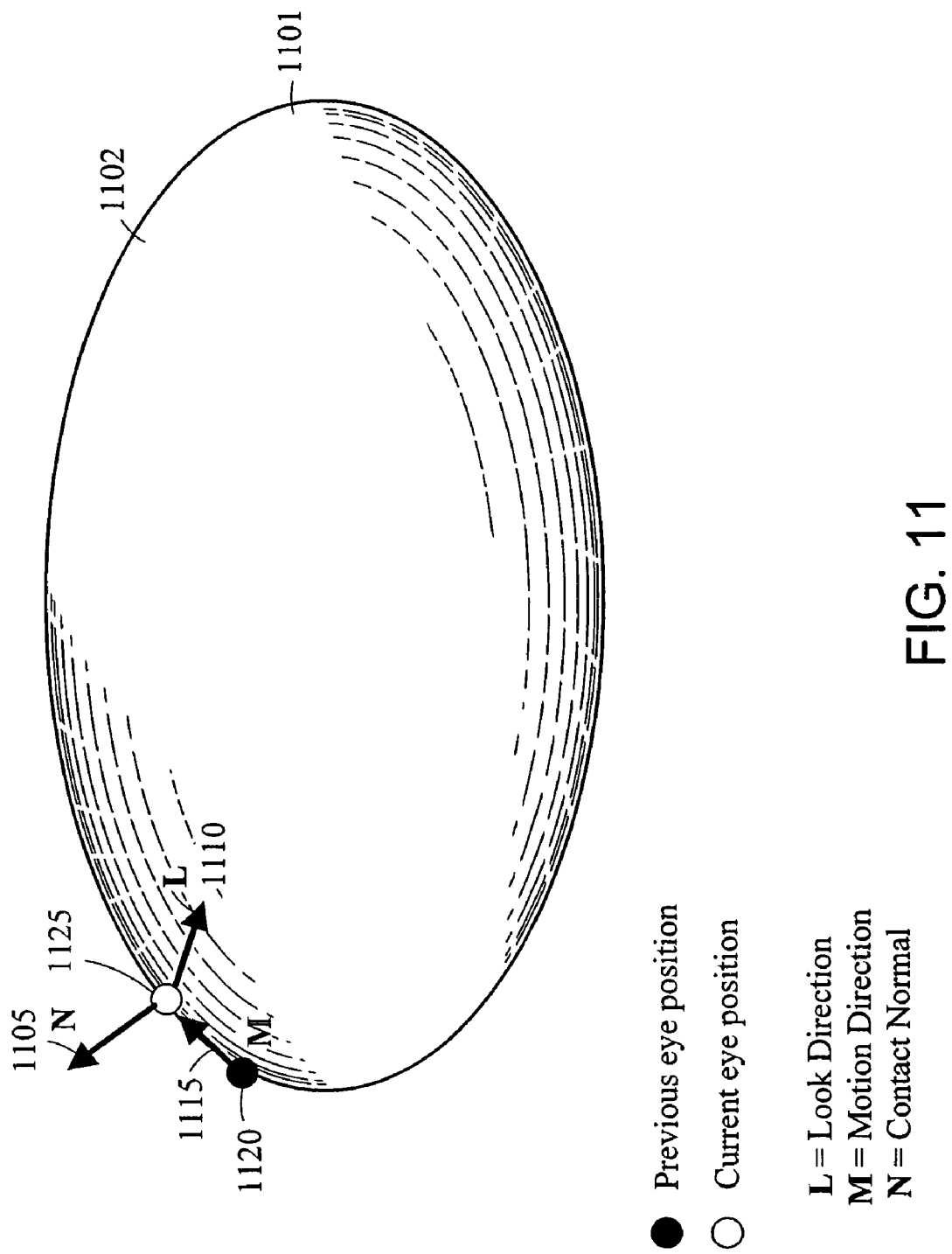
FIG. 11 is a schematic diagram illustrating the specification of a look direction for use in determining a viewing transformation for a haptic camera view when the position of a haptic interface location is constrained on the surface of a virtual object, according to an illustrative embodiment of the invention.

The look direction of the world-view transformation is determined by the motion of the proxy and optionally by the contact normal, for example, if the proxy is in contact with a virtual object in the virtual environment. When in contact with a virtual object, the proxy's position can be constrained to remain on the surface of the contacted virtual object. FIG. 11 illustrates the look direction 1110 when the virtual proxy is in contact with a virtual object 1101. Additionally, the camera eye position is updated as soon as the proxy has moved beyond a threshold distance. This defines the motion vector 1120 of the proxy. When moving in free space, the look direction is the normalized motion vector 1120. However, when in contact with a virtual object 1101, the look direction is a linear combination of the normalized motion vector 1120 and the contact normal 1105, as illustrated in FIG. 11. For example, where the haptic interface location (proxy position) is on the surface of the virtual object, as shown in FIGS. 8A and 8B, the look direction may be computed as a linear combination of the normalized motion vector and the contact normal. Thus, the haptic camera angle tilts to show more of what lies ahead, along the direction of motion.

The world-view transformation 905 of FIG. 9 can be computed by forming a composite rotation-translation matrix that transforms coordinates from world coordinates into view coordinates, mapping the look direction to an-axis (preferably the z-axis), and mapping the camera eye position to the origin. An up vector, such as the y-axis, may be selected to keep the view consistently oriented.

Another of the transformations in the 3D transformation pipeline of FIG. 9 is the view-clip transformation 910, also known as the projection transform. The view-clip transformation 910 enables manipulations of the shape and size of the view volume. The view volume determines which geometry is lit and rasterized for display on the 2D display device. As a result, geometry that lies outside the view volume is usually excluded from the remainder of the graphics pipeline.

When data from a virtual haptic camera is used for haptic rendering, the view volume may be sized so as to include only objects that are likely to be touched. In one embodiment, the size of the view volume is specified as a radius of motion in workspace coordinates of the haptic device which is transformed into view coordinates when composing the view-clip matrix. An orthographic view volume mapping centered around the origin is used with extents determined by the motion radius. By limiting the size of the view volume via the view-clip transformation 910, it is possible to localize the geometry that is received by the graphic pipeline when haptically rendering the scene, thereby optimizing the haptic rendering process.

Another of the transformations in the 3D transformation pipeline of FIG. 9 is the clip-window transformation 915, which converts clip coordinates into the physical coordinates of the display device so that an object in clip coordinates may be displayed on the display device. The clip-window transformation 915 is specified by a 2D pixel offset and a width and height in pixels. By using the clip-window transformation 915, it is possible to limit the amount of pixels used for rasterizing the geometry in the graphics pipeline. For optimal performance, it is not necessary to rasterize the localized contents of the view volume using the entire pixel buffer dimensions. There may be a tradeoff between performance and sampling error. For example, if the pixel buffer is too big, it will require more memory and copying time. However, if the pixel buffer is too small, it is possible that too many details will be lost for adequately realistic haptic rendering. The size of a display device buffer may be determined in consideration of the aforementioned tradeoff. In one embodiment, a width and height of 256 by 256 pixels for the display device buffer provides a sufficient compromise. Optimization of these dimensions is possible by considering the allowable time for pixel buffer read-back from the graphics card and the size of the smallest geometric feature in pixel coordinates.

The view-touch transformation 920 maps an object from view-coordinates into the touch coordinate space. The view-touch transformation 920 is convenient for altering the alignment or offset of touch interactions with respect to the view. As a default, this transformation may be left as identity so that the position and alignment of touch interactions are consistent with the view position and direction. However, the view-touch transformation 920 may be optionally modified to accommodate touch interactions with the scene in which the haptic device and display device are meant to be independent, for example, during use of a head-mounted display.

The touch-workspace transformation 925 maps an object in touch-coordinates into the local coordinate space of the haptic interface device. The haptic workspace is the physical space reachable by the haptic device. For example, the PHANTOM® Omni™ device, manufactured by SensAble Technologies, Inc., of Woburn, Mass., has a physical workspace of dimensions 160×120×70 mm.

The shape-world transformation 900, the world-view transformation 905, the view-clip transformation 910, the clip-window transformation 915, the view-touch transformation 920, and/or the touch-workspace transformation 925 may be structured for viewing a scene of a virtual environment from any of one or more virtual cameras. For example, these transformations may be structured for viewing a scene from a first virtual camera dedicated to haptic rendering, as well as a second virtual camera dedicated to graphical rendering. The processing capability of the graphics pipeline is leveraged for both graphical and haptic rendering.

Figure 12:
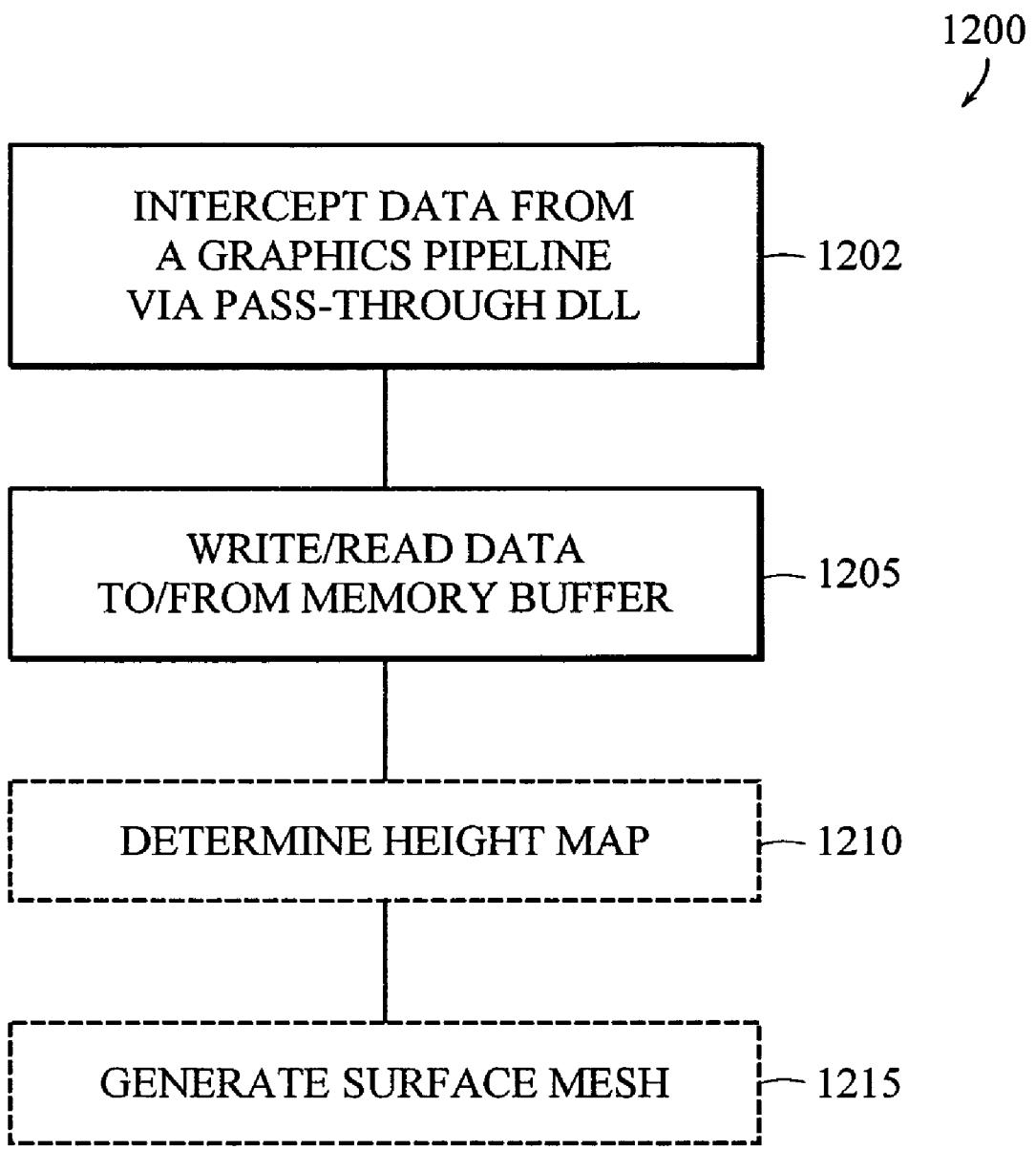
FIG. 12 is a block diagram featuring a method for interpreting data for haptic rendering by intercepting data from a graphics pipeline via a pass-through dynamic link library (DLL), according to an illustrative embodiment of the invention.

FIG. 12 is a block diagram 1200 featuring an alternative method for interpreting data for haptic rendering, including the step of intercepting data from a graphics pipeline via a pass-through dynamic link library (DLL). In Step 1202, data is intercepted from the graphics pipeline of a 3D graphics application using a pass-through dynamic link library (DLL). A graphics API generally uses a DLL file so that a 3D graphics application may access the functions in its library. A pass-through DLL may be named to match the name of the usual DLL file used by the graphics API, while the "real" graphics API DLL file is renamed. As a result, function calls from the 3D graphics application will call the pass through DLL, instead of calling the graphics API DLL. The pass-through DLL does not impede normal functioning of the 3D graphics application because all function calls are redirected by the pass-through DLL to the regular graphics API DLL.

In order for the pass-through DLL to intercept data from the 3D graphics pipeline, logic is inserted in its code to respond to particular graphics API function calls. The pass-through DLL may also directly call functions of the graphics API, hence directly accessing the 3D graphics pipeline and the associated buffer data. Creating a pass-through DLL may require replicating the exported function table interface of the graphics API DLL. This may be accomplished by determining the signature of every function exported by the DLL. A binary file dumper can then be used to view the symbols exported by the DLL and access to the header file can be used for determining the number and type of the function arguments and return type.

In step 1205 of the method of FIG. 12, a subset of the accessed data is written to a memory buffer and a subset of data is read from this memory buffer. This memory buffer may be shared between the pass through DLL and a separate haptic rendering process.

In optional step 1210 of the method of FIG. 12, a height map is determined using the accessed data. For example, if the depth buffer is accessed in step 1200, the depth buffer itself may be treated as a height map. Such a height map may describe at least some of a surface of a virtual object in the virtual environment. In optional step 1215, a mesh is generated using the height map determined in step 1210. However, in a preferred embodiment, the haptic rendering method interprets a height field directly, as described elsewhere herein. Haptic rendering of a depth buffer is performed directly in screen space and in a local fashion (i.e. via a haptic camera). It is not necessary that the entire image be transformed and then processed to generate a mesh. In order to generate a mesh from depth buffer data, the data representing depth values and screen coordinate locations may be transformed from screen space to object space.

Figure 13:
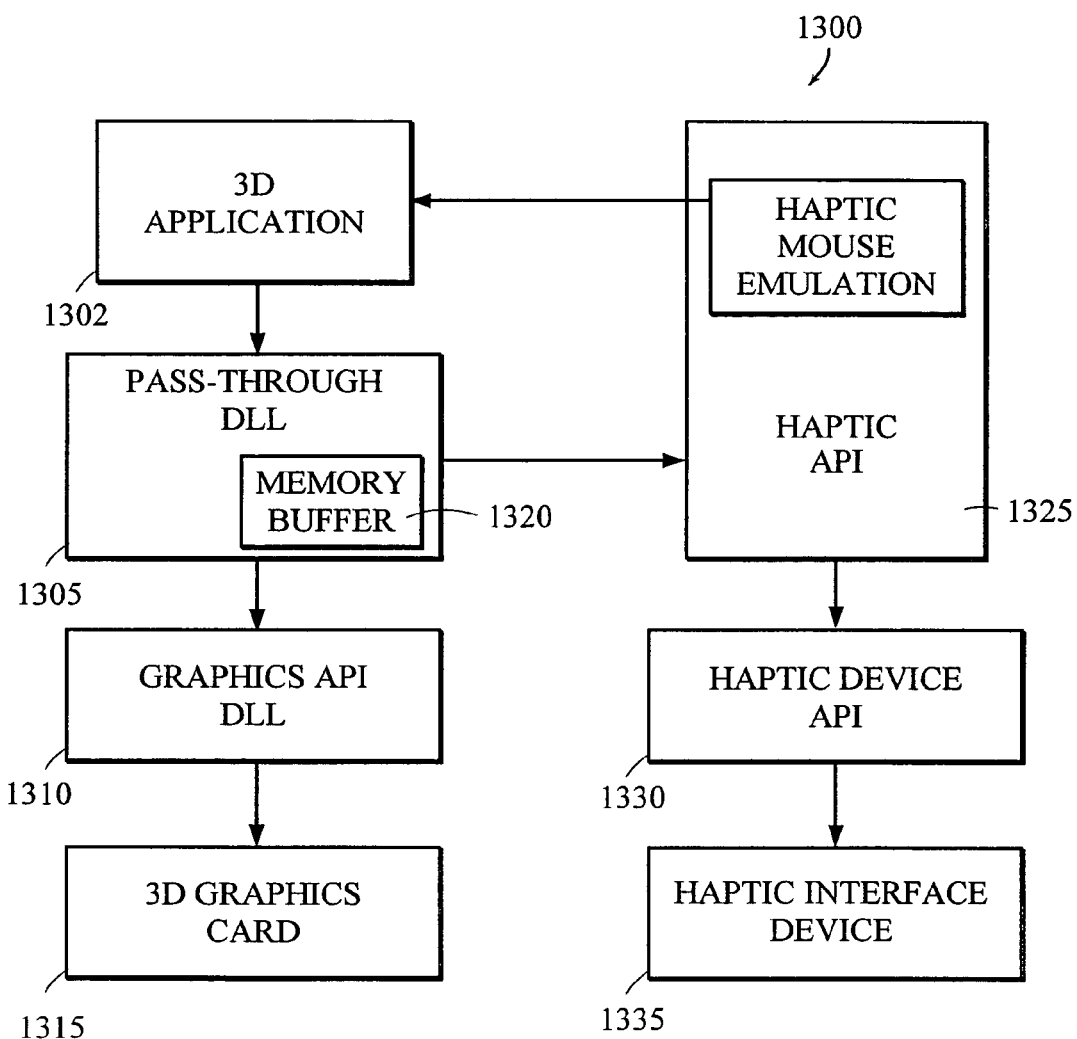
FIG. 13 is a schematic diagram illustrating a system for haptically rendering a virtual environment using data intercepted from a graphics pipeline of a 3D graphics application via a pass-through dynamic link library, according to an illustrative embodiment of the invention.

FIG. 13 is a schematic diagram 1300 illustrating an alternative system for haptically rendering a virtual environment using data intercepted from a graphics pipeline of a 3D graphics application via a pass-through dynamic link library. In one embodiment, a 3D graphics application 1300 is developed using a graphics API. When the 3D graphics application 1300 makes calls to the graphics API DLL file 1310, the calls are intercepted by a pass-through DLL file 1305. The pass-through DLL does not impede normal functioning of the 3D graphics application because all function calls are redirected by the pass through DLL to the regular graphics API DLL.

The pass-through DLL 1305 may then make function calls to the graphics API DLL 1310, thereby accessing buffer data from the 3D graphics pipeline. The graphics API DLL 1310 operates to render graphics on a display screen via a 3D graphics card 1315. However, the pass-through DLL 1305 may call the graphics API DLL to access the graphic rendering data from the 3D graphics pipeline and store this data in memory buffer 1320. The data may be read from the memory buffer 1320 in a haptic rendering process to provide touch feedback based on the intercepted graphical data.

Thus, the memory buffer 1320 may be shared with a haptic API 1325. For example, the haptic API 1325 accesses the graphic rendering data in the memory buffer 1320 and prepares it for low level haptic rendering by the haptic device API 1330. The haptic device API 1330 then produces a force signal which a device driver uses to generate and transmit a force to a user via the haptic interface device 1335.

EQUIVALENTS

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method for interpreting data for use in a haptic rendering of a virtual environment, the method comprising the steps of:
accessing graphical rendering data in a graphics pipeline of a 3D graphics processor, wherein the graphical rendering data is collected from a virtual camera and comprises data generated to produce a 2D screen view of a 3D virtual object in the virtual environment; and
interpreting the graphical rendering data for use in a haptic rendering of the 3D virtual object in the virtual environment, wherein the interpreting step comprises defining a force to be transmitted to a user via a haptic interface device.

2. The method of claim 1, wherein the graphical rendering data comprises a representation of a geometric element of the virtual object in the virtual environment.

3. The method of claim 1, further comprising at least one of the following steps:
creating a graphical rendering of the virtual object;
storing a graphical rendering of the virtual object;
displaying a graphical rendering of the virtual object;
printing a graphical rendering of the virtual object; and
modifying a graphical rendering of the virtual object.

4. The method of claim 1, wherein the graphical rendering data comprises at least one of the following: at least a portion of a depth buffer; at least a portion of a feedback buffer; at least a portion of a color buffer; at least a portion of a selection buffer; at least a portion of an accumulation buffer; at least a portion of a texture map; at least a portion of a fat framebuffer; data from a pixel shading program; data from a vertex shading program; rasterization primitives; application programming interface input data; and state data.

5. The method of claim 1, wherein the graphical rendering data comprises a transformation matrix for mapping between object space and screen space.

6. The method of claim 1, wherein the graphical rendering data comprises at least a portion of a depth buffer.

7. The method of claim 6, wherein the accessing step comprises accessing at least a portion of the depth buffer from a graphics card.

8. The method of claim 6, wherein the interpreting step comprises locating a point on a surface of a virtual object in the virtual environment using the depth buffer data.

9. The method of claim 8, wherein locating the point on the surface of the virtual object comprises:
determining an intersection point and an intersection normal in screen space; and
transforming coordinates of at least one of the intersection point and the intersection normal from screen space to object space.

10. The method of claim 6, wherein the interpreting step comprises resolving an occlusion.

11. The method of claim 6, wherein the depth buffer comprises a 2D buffer of depth values.

12. The method of claim 6, wherein the graphical rendering data comprises at least a portion of at least one of the following: a color buffer, a stencil buffer, and an accumulation buffer.

13. The method of claim 12, wherein the interpreting step comprises using the color buffer and the depth buffer to haptically interpret smooth shading along a surface of the virtual object in the virtual environment.

14. The method of claim 12, wherein the interpreting step comprises using the stencil buffer and the depth buffer to haptically interpret a variation along a surface of the virtual object in the virtual environment.

15. The method of claim 14, wherein the variation comprises at least one of a friction variation, a stiffness variation, and a damping.

16. The method of claim 1, wherein the graphical rendering data in the graphics pipeline comprises data resulting from a hardware-accelerated geometry modification.

17. The method of claim 16, wherein the hardware-accelerated geometry modification comprises at least one of a view-dependent adaptive subdivision, a view-dependent tessellation, a displacement mapping, and a normal mapping.

18. The method of claim 1, wherein the graphical rendering data comprises at least a portion of a feedback buffer.

19. The method of claim 1, wherein the graphical rendering data comprises rasterization primitives.

20. The method of claim 18, wherein the feedback buffer excludes geometric elements that lie outside a selected view volume.

21. The method of claim 18, wherein the interpreting step comprises using the feedback buffer to haptically interpret a non-uniform surface.

22. The method of claim 1, wherein the accessing step comprises sizing a view volume to exclude geometric elements that lie beyond a desired distance from a haptic interface location.

23. The method of claim 1, further comprising the step of culling at least a portion of the data in the graphics pipeline to exclude data corresponding to geometric primitives that lie outside a view volume.

24. The method of claim 23, wherein the culling step is performed using the graphics processor.

25. The method of claim 23, wherein the culling step is performed using a spatial partition.

26. The method of claim 25, wherein the spatial partition comprises a hierarchical data structure.

27. The method of claim 26, wherein the hierarchical data structure comprises at least one of an octree data structure and a BSP data structure.

28. The method of claim 23, wherein the culling step is performed using the graphics processor and a spatial partition.

29. The method of claim 1, wherein the graphical rendering data in the graphics pipeline comprises at least a portion of a fat framebuffer.

30. The method of claim 29, wherein the fat framebuffer comprises at least one member of the group consisting of: vertex positions; normals; color; texture; normal maps; bump maps; and depth data.

31. The method of claim 1, wherein the graphical rendering data comprises application programming interface data.

32. The method of claim 31, wherein the application programming interface data comprises state data.

33. The method of claim 32, wherein the state data comprises at least one of the following: an operator, an operand, a resultant state, a stencil buffer, a raster position, a lighting variable, a line width, an enabling status, and a disabling status.

34. The method of claim 1, wherein the accessing step comprises intercepting at least a portion of the data using a pass-through dynamic link library.

35. The method of claim 1, wherein the accessing step comprises writing at least a subset of the data in the graphics pipeline to a memory buffer.

36. The method of claim 35, wherein the accessing step further comprises reading at least a subset of the data that is written to the memory buffer.

37. The method of claim 1, wherein the interpreting step comprises determining a height map using the accessed graphical rendering data.

38. The method of claim 37, wherein the height map describes at least a portion of a surface of the virtual object in the virtual environment.

39. The method of claim 37, wherein the interpreting step further comprises generating a mesh from the height map.

40. The method of claim 1, wherein the interpreting step comprises: performing an
   intersection test to determine at least one intersection point and at least one intersection normal in screen space; and
   transforming coordinates of the at least one intersection point and the at least one intersection normal from screen space to object space.

41. The method of claim 40, wherein the transforming step comprises defining for each intersection point a plane tangent to the surface of a virtual object at the intersection point.

42. The method of claim 40, wherein the transforming step comprises performing a projection test to determine a geometric feature nearest a haptic interface location.

43. The method of claim 40, wherein the interpreting step comprises concatenating a plurality of transforms used by the 3D graphics processor into a single transformation.

44. The method of claim 43, wherein the plurality of transforms comprises at least one of a world-view transformation, a view-clip transformation, a clip-window transformation, a view-touch transformation, and a touch-workspace transformation.

45. The method of claim 40, wherein the interpreting step comprises correcting perspective foreshortening.

46. The method of claim 1, wherein the interpreting step comprises transforming intersection line segments from object space to screen space and transforming resultant intersection points and intersection normals from screen space to object space.

47. The method of claim 1, further comprising the step of haptically rendering the virtual environment using the interpreted data.

48. The method of claim 47, wherein the step of haptically rendering the virtual environment comprises providing a representation of a surface of the virtual object in the virtual environment.

49. The method of claim 47, wherein the step of haptically rendering the virtual environment comprises:
   determining a haptic interface location in the virtual environment corresponding to a location of the haptic interface device in real space;
   determining a location of at least one point on a surface of the virtual object in the virtual environment; and
   determining an interaction force based at least in part on the haptic interface location and the location of the at least one point of the surface of the virtual object.

50. The method of claim 49, further comprising the step of delivering the interaction force to the user through the haptic interface device.

51. The method of claim 1, comprising the step of using the interpreted data to haptically render the virtual environment in real-time during the operation of the 3D graphics processor.

52. The method of claim 1, comprising the step of generating user interface input for use by the 3D graphics processor.

53. The method of claim 52, wherein the step of generating user interface input comprises converting a 3D position of a haptic interface device into a 2D cursor position.

54. The method of claim 1, further comprising the step of haptically rendering a user interface menu.

55. The method of claim 1, wherein the graphics pipeline comprises a first camera positioned at a first location within the virtual environment.

56. The method of claim 55, wherein the graphics pipeline comprises a second camera positioned substantially at a haptic interface location within the virtual environment.

57. The method of claim 56, wherein the accessing step comprises accessing data corresponding to a view from the first camera and accessing data corresponding to a view from the second camera.

58. The method of claim 57, wherein the method further comprises the step of haptically rendering the virtual environment using the interpreted data.

59. An apparatus for providing haptic feedback to a user of a 3D graphics application, the apparatus comprising:
   a user-controlled haptic interface device adapted to provide a user input to a computer and to transmit force to the user; and
   computer software that, when operating with the computer and the user input, is adapted to determine force transmitted to the user via a haptic interface device by (i) accessing graphical rendering data from a graphics pipeline of a 3D graphics processor, the graphical rendering data having been collected from a virtual camera and comprising data generated to produce a 2D screen view of a 3D virtual object in the virtual environment and (ii) haptically rendering a 3D virtual object in a virtual environment using the accessed graphical rendering data, where the force is determined according to the position of a haptic interface location in relation to a surface of the virtual object.

60. The apparatus of claim 59, wherein the haptic interface device has at least two degrees of freedom.

61. The apparatus of claim 59, wherein the haptic interface device has six degrees of freedom.

62. The apparatus of claim 59, wherein the haptic interface device comprises at least one button input.

63. The apparatus of claim 59, wherein the haptic interface device comprises at least one member of the group consisting of a button, a joystick, a stylus, a wheel, a mouse, a gripper, a pressure pad, a toggle switch, and a pressure switch.

64. The apparatus of claim 59, wherein the 3D processor comprises at least one graphics tool.

65. The apparatus of claim 64, wherein the at least one graphics tool comprises at least one member selected from the group consisting of a drawing tool, an editing tool, a control point editing tool, a sculpting tool, a pressure-sensitive sculpting tool, a painting tool, a pressure-sensitive painting tool, an airbrush, and an angle-sensitive airbrush.

66. The apparatus of claim 59, wherein force transmitted to the user is a function of an action of a graphics tool of the 3D graphics processor.

67. The apparatus of claim 59, wherein the haptic interface device is adapted to receive force from the user.

68. The apparatus of claim 67, wherein the user input comprises user-imposed force, and wherein the software is adapted to generate input for use by the 3D graphics processor based at least in part on the user-imposed force.

69. The apparatus of claim 59, wherein the virtual environment comprises at least one animated virtual object.

* * * * *